(12) United States Patent
Meyer et al.

(10) Patent No.: US 6,691,020 B2
(45) Date of Patent: *Feb. 10, 2004

(54) METHOD AND SYSTEM FOR OPTIMIZING PURGE OF EXHAUST GAS CONSTITUENT STORED IN AN EMISSION CONTROL DEVICE

(75) Inventors: Garth Michael Meyer, Dearborn, MI (US); Joseph Richard Asik, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 372 days.

This patent is subject to a terminal disclaimer.

(21) Appl. No.: 09/884,753

(22) Filed: Jun. 19, 2001

(65) Prior Publication Data

US 2003/0004634 A1 Jan. 2, 2003

(51) Int. Cl.$^7$ ................................................. F01N 3/00
(52) U.S. Cl. ........................... 701/108; 60/276; 60/285; 123/520
(58) Field of Search ............................... 701/108, 109, 701/102; 123/516, 520, 690, 698; 60/274, 276, 285, 295

(56) References Cited

U.S. PATENT DOCUMENTS

| | | |
|---|---|---|
| 3,696,618 A | 10/1972 | Boyd et al. |
| 3,969,932 A | 7/1976 | Rieger et al. |
| 4,033,122 A | 7/1977 | Masaki et al. |
| 4,036,014 A | 7/1977 | Ariga |
| 4,167,924 A | 9/1979 | Carlson et al. |
| 4,178,883 A | 12/1979 | Herth |
| 4,186,296 A | 1/1980 | Crump, Jr. |
| 4,251,989 A | 2/1981 | Norimatsu et al. |
| 4,533,900 A | 8/1985 | Muhlberger et al. |
| 4,622,809 A | 11/1986 | Abthoff et al. |
| 4,677,955 A | 7/1987 | Takao |
| 4,854,123 A | 8/1989 | Inoue |

(List continued on next page.)

FOREIGN PATENT DOCUMENTS

| | | |
|---|---|---|
| DE | 196 07 151 C1 | 7/1997 |
| EP | 0 351 197 A2 | 1/1990 |

(List continued on next page.)

OTHER PUBLICATIONS

C. D. De Boer et al., "Engineered Control Strategies for Improved Catalytic Control of NO$_x$ in Lean Burn Applications," SAE Technical Paper No. 881595, Oct. 10–13, 1988.

Y. Kaneko et al., "Effect of Air–Fuel Ratio Modulation on Conversion Efficiency of Three–Way Catalysts," SAE Technical Paper No. 780607, Jun. 5–9, 1978, pp. 119–127.

W. H. Holl, "Air–Fuel Control to Reduce Emissions I. Engine–Emissions Relationships," SAE Technical Paper No. 800051, Feb. 25–29, 1980.

A. H. Meitzler, "Application of Exhaust–Gas–Oxygen Sensors to the Study of Storage Effects in Automotive Three–Way Catalysts," SAE Technical Paper No. 800019, Feb. 25–29, 1980.

J. Theis et al., "An Air/Fuel Algorithm to Improve the NO$_x$ Conversion of Copper–Based Catalysts," SAE Technical Paper No. 922251, Oct. 19–22, 1992.

(List continued on next page.)

Primary Examiner—Hieu T. Vo
(74) Attorney, Agent, or Firm—Julia Voutyras; Allan J. Lippa

(57) ABSTRACT

A method and system for optimizing the purging of a constituent gas of a vehicle engine's generated exhaust gas from an emission control device is disclosed wherein the amplitude of the output signal generated by a downstream switching oxygen sensor, and the time response of the sensor, is used to iteratively adjust a current purge time to obtain an optimized purge time.

20 Claims, 15 Drawing Sheets

U.S. PATENT DOCUMENTS

| | | |
|---|---|---|
| 4,884,066 A | 11/1989 | Miyata et al. |
| 4,913,122 A | 4/1990 | Uchida et al. |
| 4,964,272 A | 10/1990 | Kayanuma |
| 5,009,210 A | 4/1991 | Nakagawa et al. |
| 5,088,281 A | 2/1992 | Izutani et al. |
| 5,097,700 A | 3/1992 | Nakane |
| 5,165,230 A | 11/1992 | Kayanuma et al. |
| 5,174,111 A | 12/1992 | Nomura et al. |
| 5,189,876 A | 3/1993 | Hirota et al. |
| 5,201,802 A | 4/1993 | Hirota et al. |
| 5,209,061 A | 5/1993 | Takeshima |
| 5,222,471 A | 6/1993 | Stueven |
| 5,233,830 A | 8/1993 | Takeshima et al. |
| 5,267,439 A | 12/1993 | Raff et al. |
| 5,270,024 A | 12/1993 | Kasahara et al. |
| 5,272,871 A | 12/1993 | Oshima et al. |
| 5,325,664 A | 7/1994 | Seki et al. |
| 5,331,809 A | 7/1994 | Takeshima et al. |
| 5,335,538 A | 8/1994 | Blischke et al. |
| 5,357,750 A | 10/1994 | Ito et al. |
| 5,359,852 A | 11/1994 | Curran et al. |
| 5,377,484 A | 1/1995 | Shimizu |
| 5,379,591 A * | 1/1995 | Iwata et al. .................. 60/276 |
| 5,402,641 A | 4/1995 | Katoh et al. |
| 5,410,873 A | 5/1995 | Tashiro |
| 5,412,945 A | 5/1995 | Katoh et al. |
| 5,412,946 A | 5/1995 | Oshima et al. |
| 5,414,994 A | 5/1995 | Cullen et al. |
| 5,419,122 A | 5/1995 | Tabe et al. |
| 5,423,181 A | 6/1995 | Katoh et al. |
| 5,426,934 A | 6/1995 | Hunt et al. |
| 5,433,074 A | 7/1995 | Seto et al. |
| 5,437,153 A | 8/1995 | Takeshima et al. |
| 5,448,886 A | 9/1995 | Toyoda |
| 5,448,887 A | 9/1995 | Takeshima |
| 5,450,722 A | 9/1995 | Takeshima et al. |
| 5,452,576 A | 9/1995 | Hamburg et al. |
| 5,472,673 A | 12/1995 | Goto et al. |
| 5,473,887 A | 12/1995 | Takeshima et al. |
| 5,473,890 A | 12/1995 | Takeshima et al. |
| 5,483,795 A | 1/1996 | Katoh et al. |
| 5,531,972 A | 7/1996 | Rudy |
| 5,544,482 A | 8/1996 | Matsumoto et al. |
| 5,551,231 A | 9/1996 | Tanaka et al. |
| 5,554,269 A | 9/1996 | Joseph et al. |
| 5,569,848 A | 10/1996 | Sharp |
| 5,570,674 A * | 11/1996 | Izumiura et al. ............ 123/520 |
| 5,577,382 A | 11/1996 | Kihara et al. |
| 5,595,060 A | 1/1997 | Togai et al. |
| 5,598,703 A | 2/1997 | Hamburg et al. |
| 5,617,722 A | 4/1997 | Takaku |
| 5,622,047 A | 4/1997 | Yamashita et al. |
| 5,626,014 A | 5/1997 | Hepburn et al. |
| 5,626,117 A | 5/1997 | Wright et al. |
| 5,655,363 A | 8/1997 | Ito et al. |
| 5,657,625 A | 8/1997 | Koga et al. |
| 5,693,877 A | 12/1997 | Ohsuga et al. |
| 5,713,199 A | 2/1998 | Takeshima et al. |
| 5,715,679 A | 2/1998 | Asanuma et al. |
| 5,722,236 A | 3/1998 | Cullen et al. |
| 5,724,808 A | 3/1998 | Ito et al. |
| 5,729,971 A | 3/1998 | Matsuno et al. |
| 5,732,554 A | 3/1998 | Sasaki et al. |
| 5,735,119 A | 4/1998 | Asanuma et al. |
| 5,737,917 A | 4/1998 | Nagai |
| 5,740,669 A | 4/1998 | Kinugasa et al. |
| 5,743,084 A | 4/1998 | Hepburn |
| 5,743,086 A | 4/1998 | Nagai |
| 5,746,049 A | 5/1998 | Cullen et al. |
| 5,746,052 A | 5/1998 | Kinugasa et al. |
| 5,752,492 A | 5/1998 | Kato et al. |
| 5,771,685 A | 6/1998 | Hepburn |
| 5,771,686 A | 6/1998 | Pischinger et al. |
| 5,778,666 A | 7/1998 | Cullen et al. |
| 5,792,436 A | 8/1998 | Feeley et al. |
| 5,802,843 A | 9/1998 | Kurihara et al. |
| 5,803,048 A | 9/1998 | Yano et al. |
| 5,806,306 A | 9/1998 | Okamoto et al. |
| 5,813,387 A | 9/1998 | Minowa et al. |
| 5,831,267 A | 11/1998 | Jack et al. |
| 5,832,722 A | 11/1998 | Cullen et al. |
| 5,842,339 A | 12/1998 | Bush et al. |
| 5,842,340 A | 12/1998 | Bush et al. |
| 5,862,661 A | 1/1999 | Zhang et al. |
| 5,865,027 A | 2/1999 | Hanafusa et al. |
| 5,867,983 A | 2/1999 | Otani |
| 5,877,413 A | 3/1999 | Hamburg et al. |
| 5,910,096 A | 6/1999 | Hepburn et al. |
| 5,929,320 A | 7/1999 | Yoo |
| 5,934,072 A | 8/1999 | Hirota et al. |
| 5,938,715 A | 8/1999 | Zhang et al. |
| 5,953,907 A | 9/1999 | Kato et al. |
| 5,966,930 A | 10/1999 | Hatano et al. |
| 5,970,707 A | 10/1999 | Sawada et al. |
| 5,974,788 A | 11/1999 | Hepburn et al. |
| 5,974,791 A | 11/1999 | Hirota et al. |
| 5,974,793 A | 11/1999 | Kinugasa et al. |
| 5,974,794 A | 11/1999 | Gotoh et al. |
| 5,979,161 A | 11/1999 | Hanafusa et al. |
| 5,979,404 A | 11/1999 | Minowa et al. |
| 5,983,627 A | 11/1999 | Asik |
| 5,992,142 A | 11/1999 | Pott |
| 5,996,338 A | 12/1999 | Hirota |
| 6,003,308 A | 12/1999 | Tsutsumi et al. |
| 6,012,282 A | 1/2000 | Kato et al. |
| 6,012,428 A | 1/2000 | Yano et al. |
| 6,014,859 A | 1/2000 | Yoshizaki et al. |
| 6,023,929 A | 2/2000 | Ma |
| 6,026,640 A | 2/2000 | Kato et al. |
| 6,055,971 A * | 5/2000 | Beechie et al. ............. 123/680 |
| 6,058,700 A | 5/2000 | Yamashita et al. |
| 6,073,440 A | 6/2000 | Douta et al. |
| 6,079,204 A | 6/2000 | Sun et al. |
| 6,092,021 A | 7/2000 | Ehlbeck et al. |
| 6,092,369 A | 7/2000 | Hosogai et al. |
| 6,101,809 A | 8/2000 | Ishuzuka et al. |
| 6,102,019 A | 8/2000 | Brooks |
| 6,105,365 A | 8/2000 | Deeba et al. |
| 6,119,449 A | 9/2000 | Köhler |
| 6,128,899 A | 10/2000 | Oono et al. |
| 6,134,883 A | 10/2000 | Kato et al. |
| 6,138,453 A | 10/2000 | Sawada et al. |
| 6,145,302 A | 11/2000 | Zhang et al. |
| 6,145,305 A | 11/2000 | Itou et al. |
| 6,148,611 A | 11/2000 | Sato |
| 6,148,612 A | 11/2000 | Yamashita et al. |
| 6,161,378 A | 12/2000 | Hanaoka et al. |
| 6,161,428 A | 12/2000 | Esteghlal et al. |
| 6,164,064 A | 12/2000 | Pott |
| 6,189,523 B1 | 2/2001 | Weisbrod et al. |
| 6,199,373 B1 | 3/2001 | Hepburn et al. |
| 6,202,406 B1 | 3/2001 | Griffin et al. |
| 6,205,773 B1 | 3/2001 | Suzuki |
| 6,214,207 B1 | 4/2001 | Miyata et al. |
| 6,216,448 B1 | 4/2001 | Schnaibel et al. |
| 6,216,451 B1 | 4/2001 | Schnaibel et al. |
| 6,233,923 B1 | 5/2001 | Itou et al. |
| 6,237,330 B1 | 5/2001 | Takahashi et al. |
| 6,244,046 B1 | 6/2001 | Yamashita |
| 6,453,665 B1 * | 9/2002 | Bower et al. ................ 60/285 |
| 6,463,733 B1 * | 10/2002 | Asik et al. .................... 60/276 |

| | | | | | | |
|---|---|---|---|---|---|---|
| 6,487,853 | B1 | * | 12/2002 | Hepburn et al. | ............... | 60/295 |
| 6,502,387 | B1 | * | 1/2003 | Asik et al. | .................... | 60/274 |
| 6,553,754 | B2 | * | 4/2003 | Meyer et al. | ................. | 60/274 |
| 6,564,781 | B2 | * | 5/2003 | Matsumoto et al. | ........ | 123/520 |

FOREIGN PATENT DOCUMENTS

| | | |
|---|---|---|
| EP | 0 444 783 A1 | 9/1991 |
| EP | 0 503 882 A1 | 9/1992 |
| EP | 0 508 389 A1 | 1/1994 |
| JP | 62-97630 | 5/1987 |
| JP | 62-117620 | 5/1987 |
| JP | 64-53042 | 3/1989 |
| JP | 2-30915 | 2/1990 |
| JP | 2-33408 | 2/1990 |
| JP | 2-207159 | 8/1990 |
| JP | 3-135147 | 6/1991 |
| JP | 5-26080 | 2/1993 |
| JP | 5-106493 | 4/1993 |
| JP | 5-106494 | 4/1993 |
| JP | 6-58139 | 3/1994 |
| JP | 6-264787 | 9/1994 |
| JP | 7-97941 | 4/1995 |
| WO | WO 98/27322 | 6/1998 |

OTHER PUBLICATIONS

W. Wang, "Air–Fuel Control to Reduce Emissions, II. Engine–Catalyst Characterization Under Cyclic Conditions," SAE Technical Paper No. 800052, Feb. 25–29, 1980.

T. Yamamoto et al., "Dynamic Behavior Analysis of Three Way Catalytic Reaction," JSAE 882072–882166.

* cited by examiner

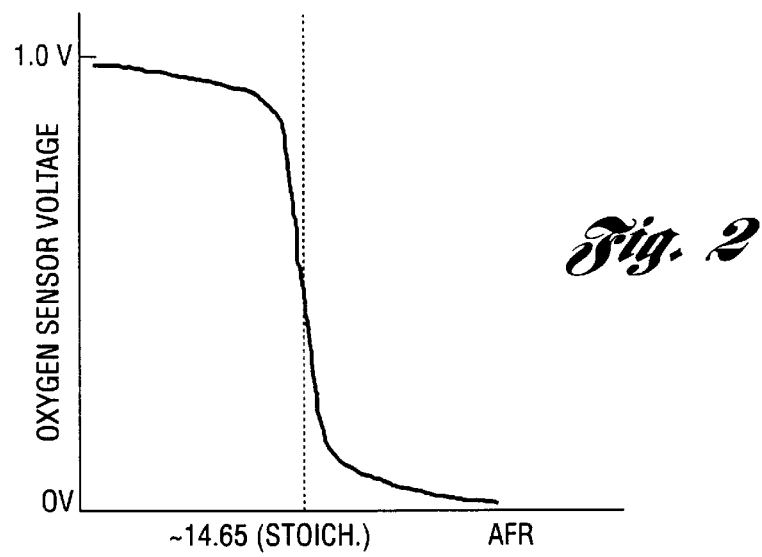
Fig. 2
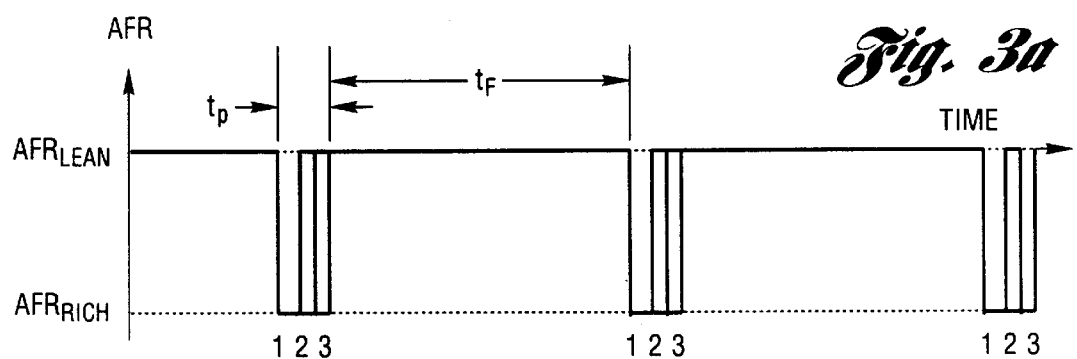
Fig. 3a
Fig. 3b
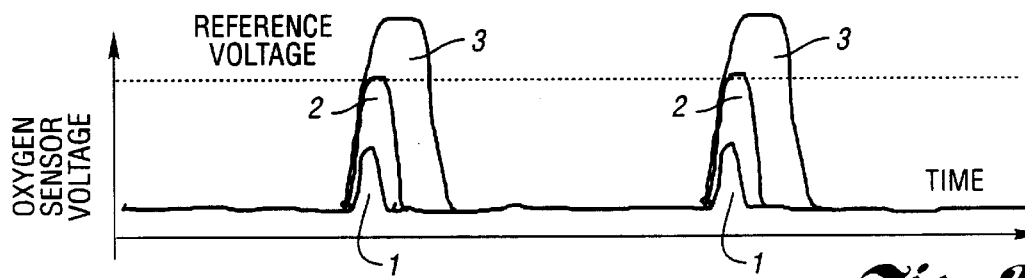
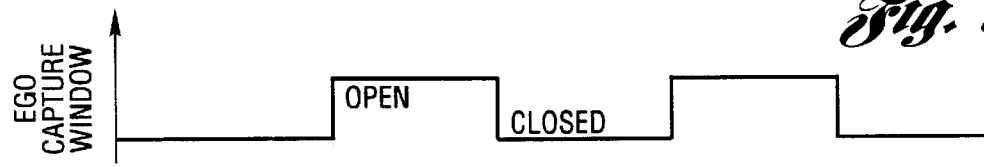
Fig. 3c
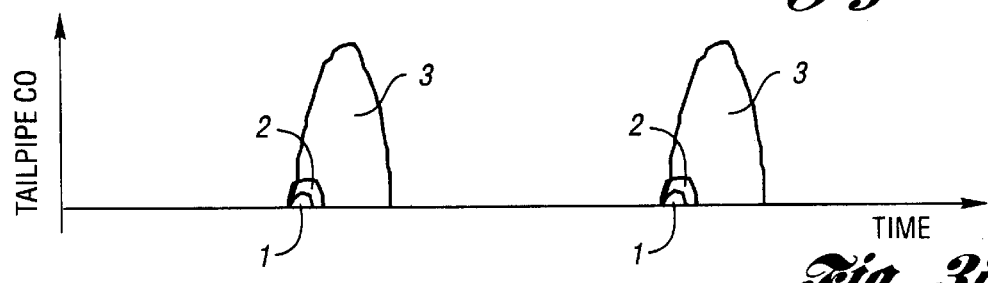
Fig. 3d

METHOD AND SYSTEM FOR OPTIMIZING PURGE OF EXHAUST GAS CONSTITUENT STORED IN AN EMISSION CONTROL DEVICE

BACKGROUND OF THE INVENTION

1. Field of the Invention

The invention relates to a method of optimizing the release of constituent exhaust gas that has been stored in a vehicle emission control device during "lean-burn" vehicle operation.

2. Background Art

Generally, the operation of a vehicle's internal combustion engine produces engine exhaust that includes a variety of constituent gases, including carbon monoxide (CO), hydrocarbons (HC), and nitrogen oxides ($NO_x$). The rates at which the engine generates these constituent gases are dependent upon a variety of factors, such as engine operating speed and load, engine temperature, spark timing, and EGR. Moreover, such engines often generate increased levels of one or more constituent gases, such as $NO_x$, when the engine is operated in a lean-burn cycle, i.e., when engine operation includes engine operating conditions characterized by a ratio of intake air to injected fuel that is greater than the stoichiometric air-fuel ratio, for example, to achieve greater vehicle fuel economy.

In order to control these vehicle tailpipe emissions, the prior art teaches vehicle exhaust treatment systems that employ one or more three-way catalysts, also referred to as emission control devices, in an exhaust passage to store and release select constituent gases, such as $NO_x$, depending upon engine operating conditions. For example, U.S. Pat. No. 5,437,153 teaches an emission control device which stores exhaust gas $NO_x$ when the exhaust gas is lean, and releases previously-stored $NO_x$ when the exhaust gas is either stoichiometric or "rich" of stoichiometric, i.e., when the ratio of intake air to injected fuel is at or below the stoichiometric air-fuel ratio. Such systems often employ open-loop control of device storage and release times (also respectively known as device "fill" and "purge" times) so as to maximize the benefits of increased fuel efficiency obtained through lean engine operation without concomitantly increasing tailpipe emissions as the device becomes "filled." The timing of each purge event must be controlled so that the device does not otherwise exceed its $NO_x$ storage capacity, because $NO_x$ would then pass through the device and effect an increase in tailpipe $NO_x$ emissions. The frequency of the purge is preferably controlled to avoid the purging of only partially filled devices, due to the fuel penalty associated with the purge event's enriched air-fuel mixture.

The prior art has recognized that the storage capacity of a given emission control device is itself a function of many variables, including device temperature, device history, sulfation level, and the presence of any thermal damage to the device. Moreover, as the device approaches its maximum capacity, the prior art teaches that the incremental rate at which the device continues to store the selected constituent gas may begin to fall. Accordingly, U.S. Pat. No. 5,437,153 teaches use of a nominal $NO_x$-storage capacity for its disclosed device which is significantly less than the actual $NO_x$-storage capacity of the device, to thereby provide the device with a perfect instantaneous $NO_x$-retaining efficiency, that is, so that the device is able to store all engine-generated $NO_x$ as long as the cumulative stored $NO_x$ remains below this nominal capacity. A purge event is scheduled to rejuvenate the device whenever accumulated estimates of engine-generated $NO_x$ reach the device's nominal capacity.

The amount of the selected constituent gas that is actually stored in a given emission control device during vehicle operation depends on the concentration of the selected constituent gas in the engine feedgas, the exhaust flow rate, the ambient humidity, the device temperature, and other variables. Thus, both the device capacity and the actual quantity of the selected constituent gas stored in the device are complex functions of many variables.

SUMMARY OF THE INVENTION

It is an object of the invention to provide a method and system by which to optimize the purge time during which a previously-stored constituent gas of the engine-generated exhaust gas is released from a vehicle emission control device.

Under the invention, a method of optimizing a purge time for an emission control device, itself located in the exhaust passage of an engine upstream from an oxygen sensor, includes detecting the sensor output voltage; calculating a purge time correction factor related to a characteristic of the sensor output voltage, for example, based on the error between a desired saturation time value and a calculated saturation time value; and calculating a subsequent purge time as a function of the product of the correction factor and a present purge time. The optimization of purge time is preferably continued until the absolute value of the difference between present and subsequent purge time values, is less than an allowable tolerance.

In accordance with a feature of the invention, a preferred method includes sampling the sensor output voltage during a window to determine the peak voltage; and the calculated saturation time value is based on the time that the peak voltage is greater than a reference voltage. The calculated saturation time is also preferably based on the value of the peak voltage, particularly if the peak voltage is less than or equal to a predetermined reference voltage; and is otherwise preferably based on the time that the peak voltage exceeds the reference voltage.

In accordance with another feature of the invention, in a preferred method, the error is input to a feedback controller that produces the correction factor; and there is a direct, monotonic relationship between the correction factor and the error.

Similarly, under the invention, a programmed computer controls the purge time of the emission control device based on the amplitude of the voltage of a downstream oxygen sensor and the time response of the sensor.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 2 is a graph showing the voltage response of an oxygen sensor versus air-fuel ratio;

FIG. 3 shows various graphs comparing (a) engine air-fuel ratio, (b) tailpipe oxygen sensor response, (c) EGO data capture, and (d) tailpipe CO, versus time for a short purge time (1), a medium purge time (2) and a long purge time (3);

FIG. 15 is a map of the basic device filling rate $R_{ij}$ ($NO_x$ capacity depletion) for various speed and load points at given mapped values of temperature, air-fuel ratio, EGR and spark advance;

FIGS. 16a–16d show a listing of the mapping conditions for air-fuel ratio, EGR, spark advance, and device temperature, respectively, for which the device filling rates $R_{ij}$ were determined in FIG. 15;

FIG. 17 shows how device capacity depletion rate modifier varies with temperature;

DETAILED DESCRIPTION OF THE PREFERRED EMBODIMENT(S)

Figure 1:
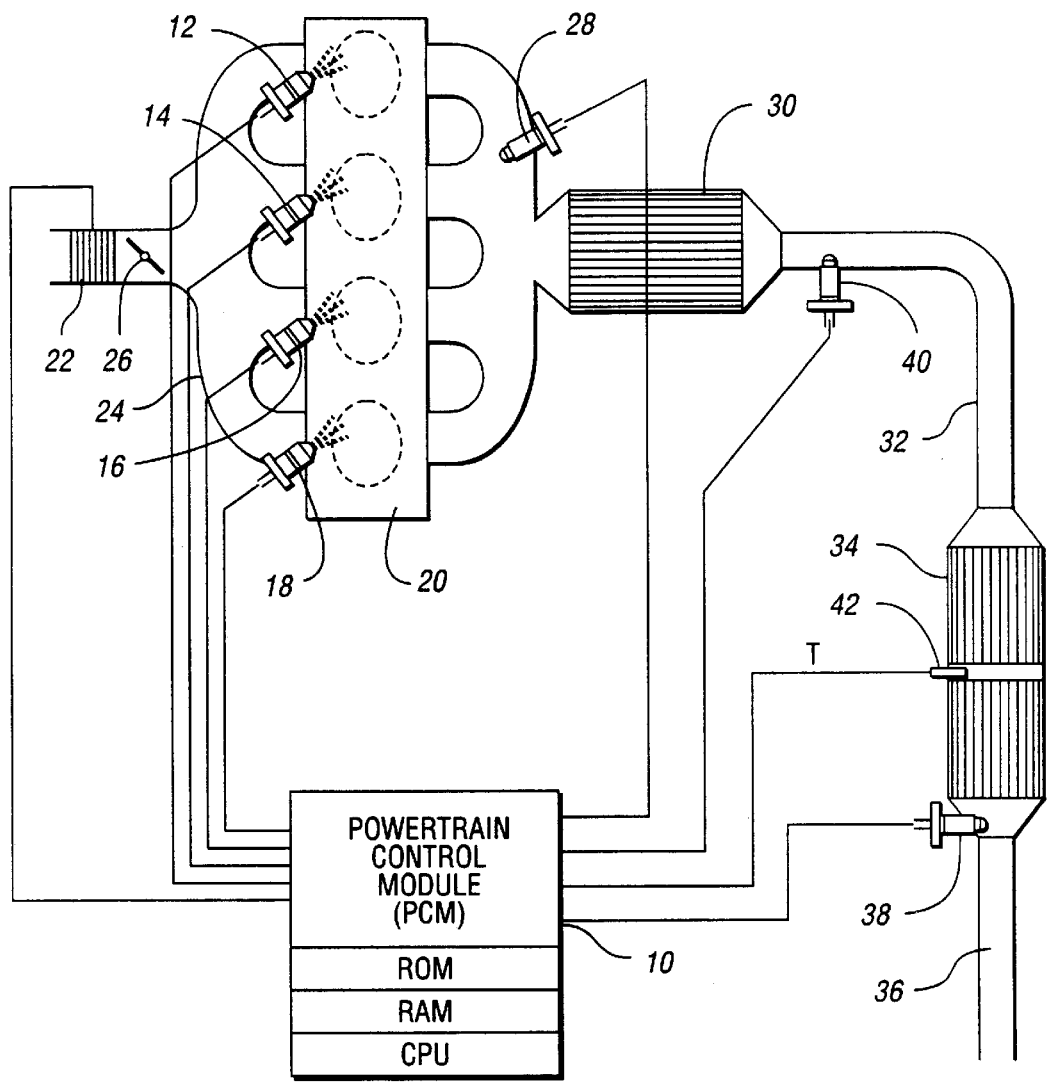
FIG. 1 is a diagram of an engine control system that embodies the principles of the invention.

Referring now to the drawings, and initially to FIG. 1, a powertrain control module (PCM) generally designated 10 is an electronic engine controller including ROM, RAM and CPU, as indicated. The PCM controls a set of injectors 12, 14, 16 and 18 which inject fuel into a four-cylinder internal combustion engine 20. The fuel injectors are of conventional design and are positioned to inject fuel into their associated cylinder in precise quantities as determined by the controller 10. The controller 10 transmits a fuel injector signal to the injectors to maintain an air-fuel ratio (also "AFR") determined by the controller 10. An airmeter or air mass flow sensor 22 is positioned at the air intake of the manifold 24 of the engine and provides a signal regarding air mass flow resulting from positioning of the throttle 26. The air flow signal is utilized by controller 10 to calculate an air mass value which is indicative of a mass of air flowing per unit time into the induction system. A heated exhaust gas oxygen (HEGO) sensor 28 detects the oxygen content of the exhaust gas generated by the engine, and transmits a signal to the controller 10. The HEGO sensor 28 is used for control of the engine air-fuel ratio, especially during stoichiometric engine operation.

As seen in FIG. 1, the engine-generated exhaust gas flows through an exhaust treatment system that includes, in series, an upstream emission control device 30, an intermediate section of exhaust pipe 32, a downstream emission control device 34, and the vehicle's tailpipe 36. While each device 30, 34 is itself a three-way catalyst, the first device 30 is preferably optimized to reduce tailpipe emissions during engine operation about stoichiometry, while the second device 34 is optimized for storage of one or more selected constituent gases of the engine exhaust gas when the engine operates "lean," and to release previously-stored constituent gas when the engine operates "rich." The exhaust treatment system further includes a second HEGO sensor 38 located downstream of the second device 34. The second HEGO sensor 38 provides a signal to the controller 10 for diagnosis and control according to the present invention. The second HEGO sensor 38 is used to monitor the HC efficiency of the first device 30 by comparing the signal amplitude of the second HEGO sensor 38 with that of the first HEGO sensor 28 during conventional stoichiometric, closed-loop limit cycle operation.

In accordance with another feature of the invention, the exhaust treatment system includes a temperature sensor 42 located at a mid-point within the second device 34 that generates an output signal representative of the instantaneous temperature T of the second device 34. Still other sensors (not shown) provide additional information to the controller 10 about engine performance, such as camshaft position, crankshaft position, angular velocity, throttle position and air temperature.

A typical voltage versus air-fuel ratio response for a switching-type oxygen sensor such as the second HEGO sensor 38 is shown in FIG. 2. The voltage output of the second HEGO sensor 38 switches between low and high levels as the exhaust mixture changes from a lean to a rich mixture relative to the stoichiometric air-fuel ratio of approximately 14.65. Since the air-fuel ratio is lean during the fill time, $NO_x$ generated in the engine passes through the first device 30 and the intermediate exhaust pipe 32 into the second device 34 where it is stored.

A typical operation of the purge cycle for the second device 34 is shown in FIG. 3. The top waveform (FIG. 3a) shows the relationship of the lean fill time $t_F$ and the rich purge time $t_P$ for three different purge times, 1, 2, and 3. The response of the second HEGO sensor 38 for the three purge times is shown in the second waveform (FIG. 3b). The amount of CO and HC passing through the second device 34 and affecting the downstream sensor 38 is used as an indicator of the effectiveness of the second device's purge event. The peak voltage level of the tailpipe oxygen sensor is an indicator of the quantities of $NO_x$ and $O_2$ that are still stored in the second device 34. For a small purge time 1, a very weak response of the oxygen sensor results since the second device 34 has not been fully purged of $NO_x$, resulting in a small spike of tailpipe CO and closely related second HEGO sensor response. For this case, the peak sensor voltage $V_P$ does not reach the reference voltage $V_{ref}$. For a moderate or optimum purge time 2, the second HEGO sensor's response $V_P$ equals the reference voltage $V_{ref}$, indicating that the second device 34 has been marginally purged, since an acceptably very small amount of tailpipe CO is generated. For a long purge 3, the second HEGO sensor's peak voltage exceeds $V_{ref}$, indicating that the second device 34 has been either fully purged or overpurged, thereby generating increased and undesirably high tailpipe CO (and HC) emissions, as illustrated by the waveform in FIG. 3d.

Figure 4:
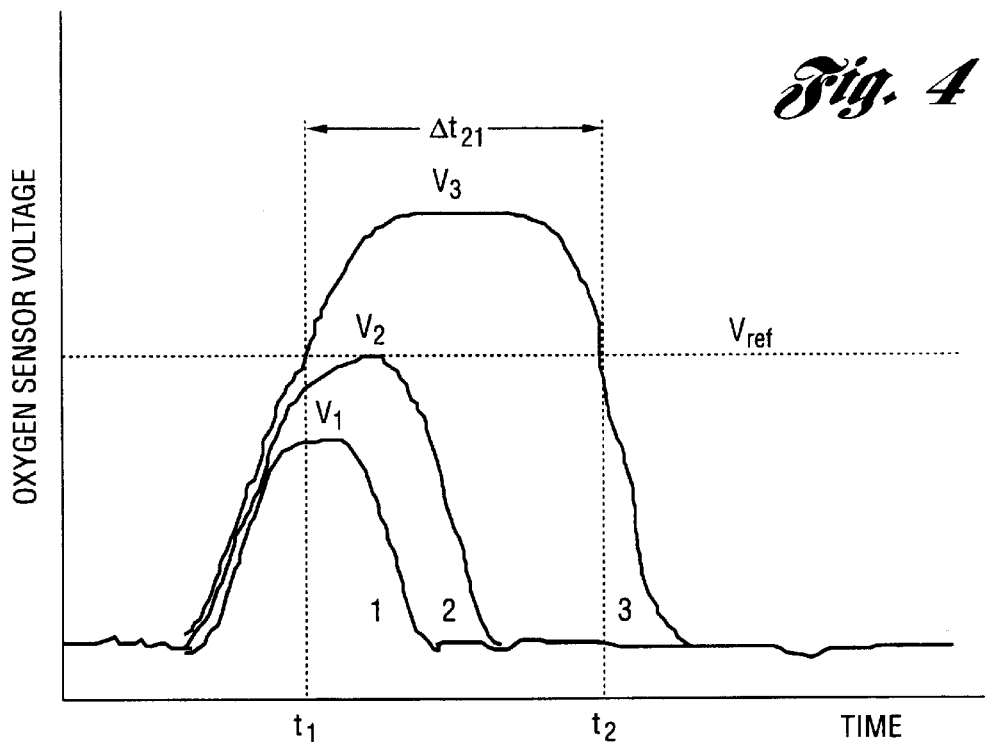
FIG. 4 is a more detailed view of oxygen sensor response versus time for a short purge time (1), a medium purge time (2) and a long purge time (3)

The data capture window for the second HEGO sensor voltage is shown in the waveform in FIG. 3c. During this window the PCM acquires data on the second HEGO sensor 38 response. FIG. 4 shows an enlarged view of the response of the sensor 38 to the three levels of purge time shown in FIG. 3. The time interval $\Delta t_{21}$ is equal to the time interval that the sensor voltage exceeds $V_{ref}$. For a peak sensor voltage $V_P$ which is less than the reference voltage $V_{ref}$, the PCM 10 provides a smooth continuation to the metric of FIG. 5 by linearly extrapolating the sensor saturation time $t_{sat}$ from $t_{sat} = t_{sat_{ref}}$ to $t_{sat} = 0$ The PCM 10 uses the oftlinerelationship shown in FIG. 6, making the sensor saturation time $t_{sat}$ proportional to the peak sensor voltage $V_P$, as depicted therein.

Figure 5:
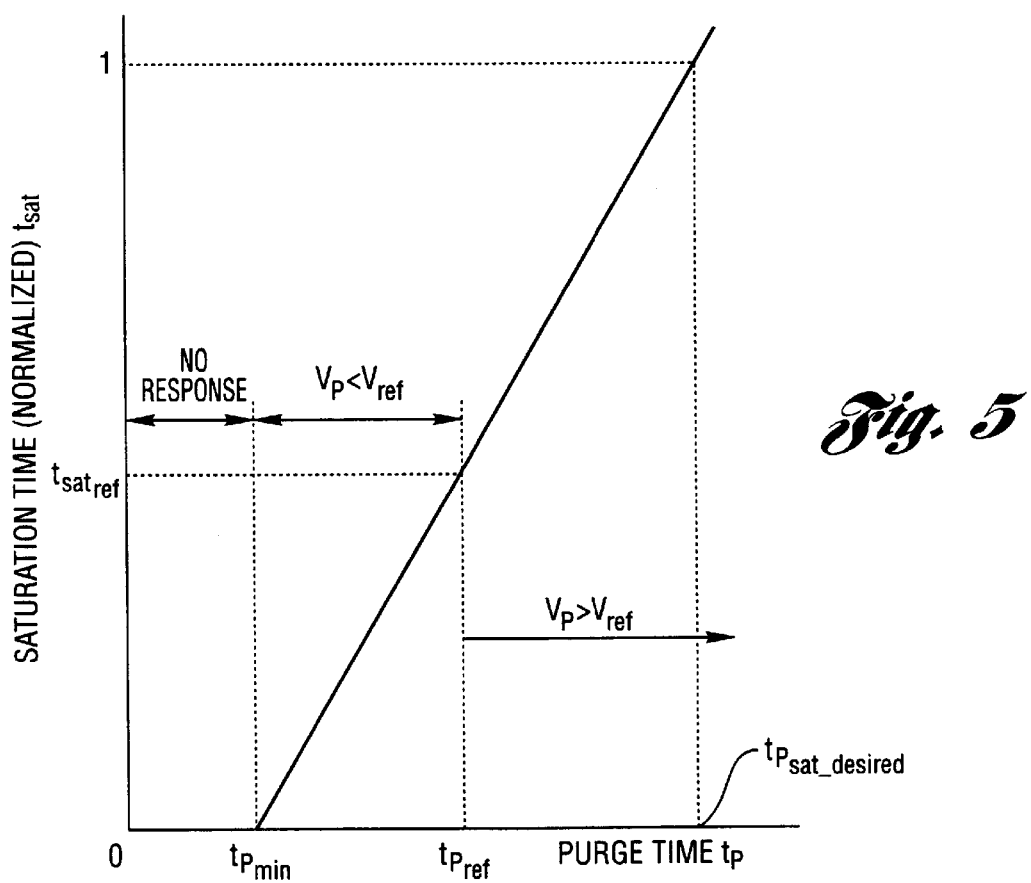
FIG. 5 is a plot of normalized oxygen sensor saturation time $t_{sat}$ as a function of purge time $t_P$.
Figure 6:
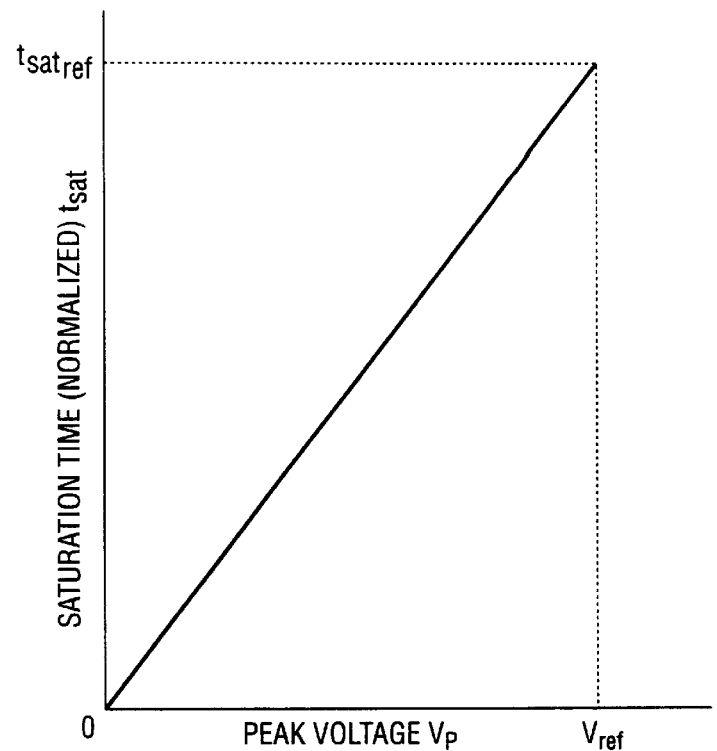
FIG. 6 is a plot of normalized saturation time $t_{sat}$ versus oxygen sensor peak voltage VP for the case where the oxygen sensor peak voltage $V_P$ is less than a reference voltage $V_{ref}$.

FIG. 5 shows the relationship between the normalized oxygen sensor saturation time $t_{sat}$ and the purge time $t_P$. The sensor saturation time $t_{sat}$ is the normalized amount of time that the second HEGO sensor signal is above $V_{ref}$ and is equal to $\Delta t_{21}/\Delta t_{21_{norm}}$, where $\Delta t_{21_{norm}}$ is the normalizing factor. The sensor saturation time $t_{sat}$ is normalized by the desired value $t_{sat_{desired}}$. For a given fill time $t_F$ and state of the second device 34, there is an optimum purge time $$t_{P_{sat\_desired}}$$

that results in an optimum normalized saturation time $t_{sat} = 1$ for which the tailpipe HC and CO are not excessive, and which still maintains an acceptable device $NO_x$-storage efficiency. For a sensor saturation time $t_{sat} > 1$, the purge time is too long and should be decreased. For a sensor saturation time $t_{sat} < 1$, the purge time is too short and should be increased. Thus, closed-loop control of the purge of the second device 34 can be achieved based on the output of the second HEGO sensor 38.

Figure 7:
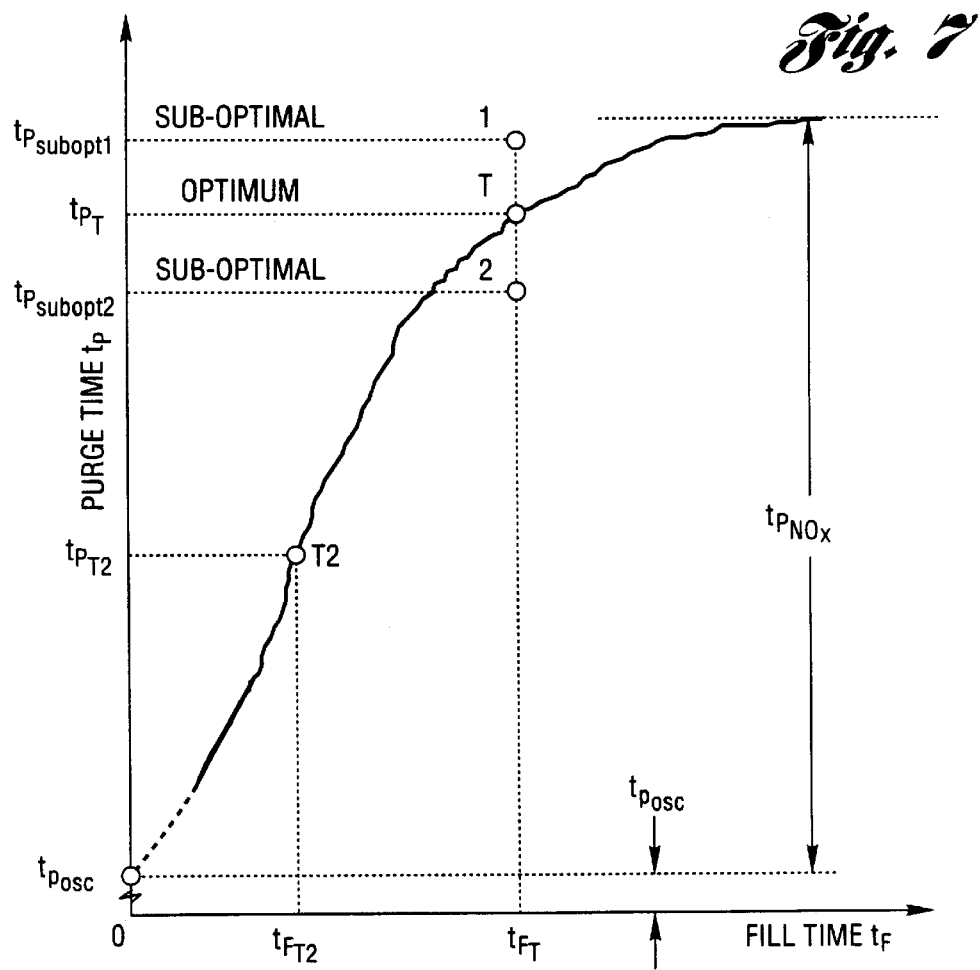
FIG. 7 shows the relationship between device purge time $t_P$ and device fill time $t_F$ and depicts the optimum purge time $t_{P_T}$ for a given fill time $t_{F_T}$, with two sub-optimal purge points 1 and 2 also illustrated.

FIG. 7 shows the nominal relationship between the purge time $t_P$ and the fill time $t_F$ for a given operating condition of the engine and for a given condition of the second device 34. The two sub-optimal purge times $t_{P_{subopt1}}$ and t $t_{P_{subopt2}}$ correspond to either under-purging or over-purging of the second device 34 for a fixed fill time $t_{F_T}$. The purge time $t_P$ that optimally purges the second device 34 of stored $NO_x$ is designated as $t_{P_T}$. This point corresponds to a target or desired purge time, $t_{sat} = t_{sat_{desired}}$. This purge time minimizes CO tailpipe emissions during the fixed fill time $t_{F_T}$. This procedure also results in a determination of the stored-oxygen purge time $t_{P_{OSC}}$, which is related to the amount of oxygen directly stored in the second device 34. Oxygen can be directly stored in the form of cerium oxide, for example. The stored-oxygen purge time $t_{P_{OSC}}$ can be determined by either extrapolating two or more optimum purge times to the $t_F = 0$ point or by conducting the $t_P$ optimization near the point $t_F = 0$. Operating point T2 is achieved by deliberately making $t_{F_{T2}} < t_{F_T}$ and finding $t_{P_{T2}}$ through the optimization.

Figure 7A:
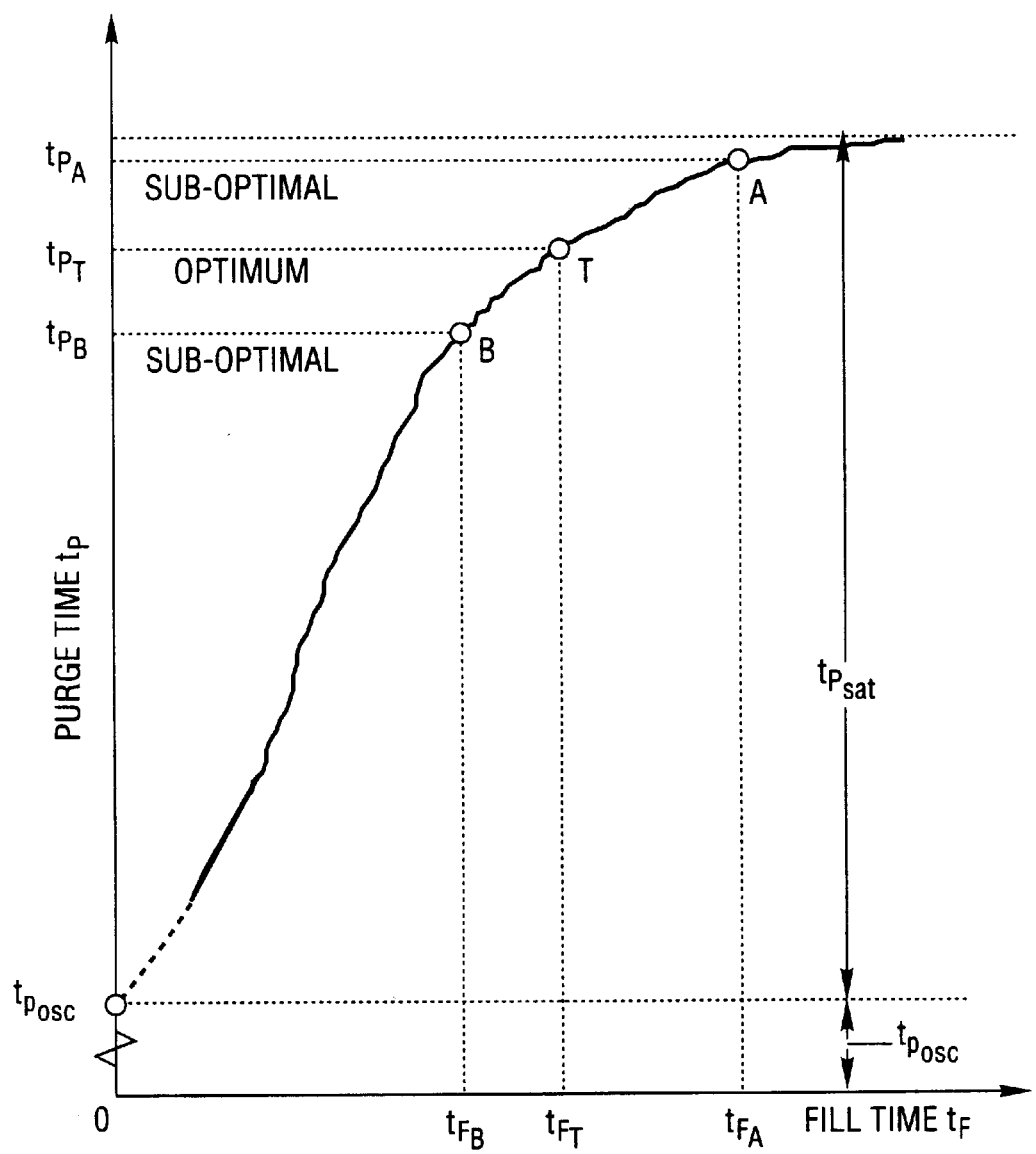
FIG. 7a shows the relationship between purge time and fill time when the purge time has been optimized for all fill times. The optimum purge time $t_{P_T}$ and fill time $t_{F_T}$ represent the preferred system operating point T. Two sub-optimal points A and B that lie on the response curve are also shown.

FIG. 7a illustrates the optimization of the fill time $t_F$. For a given fill time $t_{F_T}$, the optimum purge time $t_{P_T}$ is determined, as in FIG. 7. Then the fill time is dithered by stepping to a value $t_{F_T}$ that is slightly less than the initial value $t_{F_T}$ and stepping to a value $t_{F_A}$ that is slightly greater than the initial value $t_{F_T}$. The purge time optimization is applied at all three points, T, A, and B, in order to determine the variation of $t_P$ with $t_F$. The change in $t_P$ from A to T and also from B to T is evaluated. In FIG. 7a, the change from B to T is larger than the change from A to T. The absolute value of these differences is controlled to be within a certain tolerance DELTA_MIN, as discussed more fully with respect to FIG. 11. The absolute value of the differences is proportional to the slope of the $t_P$ versus $t_F$ curve. This optimization process defines the operating point, T, as the "shoulder" of the $t_P$ versus $t_F$ curve. $T_{P_{sat}}$ represents the saturation value of the purge time for infinitely long fill times.

Figure 8:
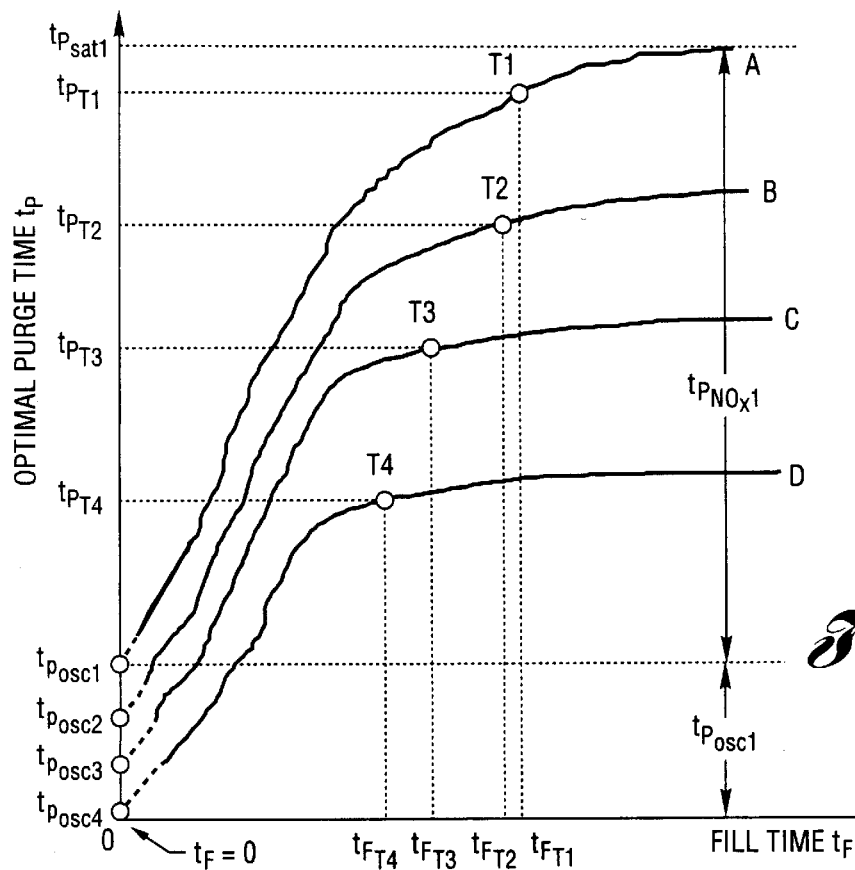
FIG. 8 shows the relationship between device purge time $t_P$ and fill time $t_F$ for four different device operating conditions of progressively increasing deterioration in $NO_x$ device capacity and further shows the extrapolated purge times for the oxygen storage portion $t_{P_{OSC}}$ of the total purge time $t_P$.

The results of the purge time $t_P$ and fill time $t_F$ optimization routine are shown in FIG. 8 for four different device states comprising different levels of stored $NO_x$ and oxygen. Both the purge time $t_P$ and the fill time $t_F$ have been optimized using the procedures described in FIGS. 7 and 7a. The point determined by FIG. 8 is designated as the optimum operating point T1, for which the purge time is $t_{P_{T1}}$ and the fill time is $t_{F_{T1}}$. The "1" designates that the second device 34 is non-deteriorated, or state A. As the second device 34 deteriorates, due to sulfur poisoning, thermal damage, or other factors, device states B, C, and D will be reached. The purge and fill optimization routines are run continuously when quasi-steady-state engine conditions exist. Optimal operating points T2, T3, and T4 will be reached, corresponding to device states B, C, and D. Both the $NO_x$ saturation level, reflected in $t_{P_{T1}}$, $t_{P_{T2}}$, $t_{P_{T3}}$, and $t_{P_{T4}}$, and the oxygen storage related purge times, $tp_{OSC_{T1}}$, $tp_{T2}$, $tp_{OSC_{T3}}$, and $tp_{OSC_{T4}}$, will vary with the state of the second device 34 and will typically decrease in value as the second device 34 deteriorates. The purge fuel for the $NO_x$ portion of the purge is equal to $t_{P_{NOx}} = t_{P_T} - T_{P_{OSC}}$. It will be appreciated that the purge fuel is equivalent to purge time for a given operating state. The controller 10 regulates the actual purge fuel by modifying the time the engine 20 is allowed to operate at a predetermined rich air-fuel ratio. To simply the discussion herein, the purge time is assumed to be equivalent to purge fuel at the assumed operating condition under discussion. Thus, direct determination of the purge time required for the $NO_x$ stored and the oxygen stored can be determined and used for diagnostics and control.

Figure 9:
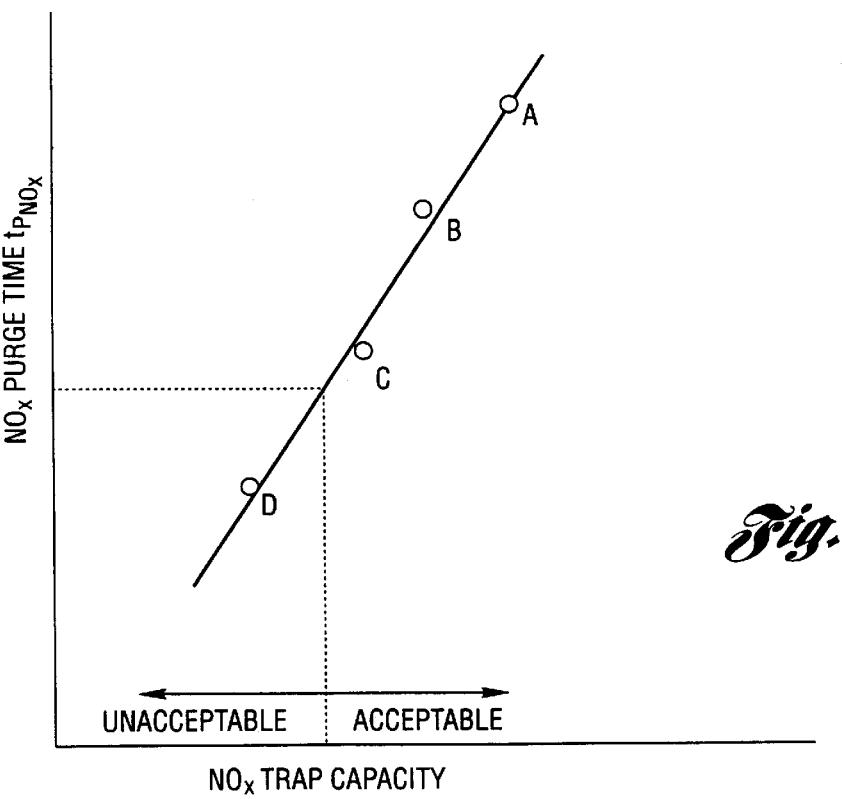
FIG. 9 shows the relationship between $NO_x$ device capacity and purge time for four different device conditions with progressively more deterioration caused by sulfation, thermal damage, or both.

FIG. 9 illustrates the relationship between the $NO_x$ purge time $t_{P_{NOx}}$ and the $NO_x$-storage capacity of the second device 34. States A, B, and C are judged to have acceptable $NO_x$ efficiency, device capacity and fuel consumption, while state D is unacceptable. Therefore, as state D is approached, a device desulfation event is scheduled to regenerate the $NO_x$-storage capacity of the second device 34 and reduce the fuel consumption accompanying a high $NO_x$ purging frequency. The change of $t_{P_{OSC}}$ can provide additional information on device aging through the change in oxygen storage.

Figure 10:
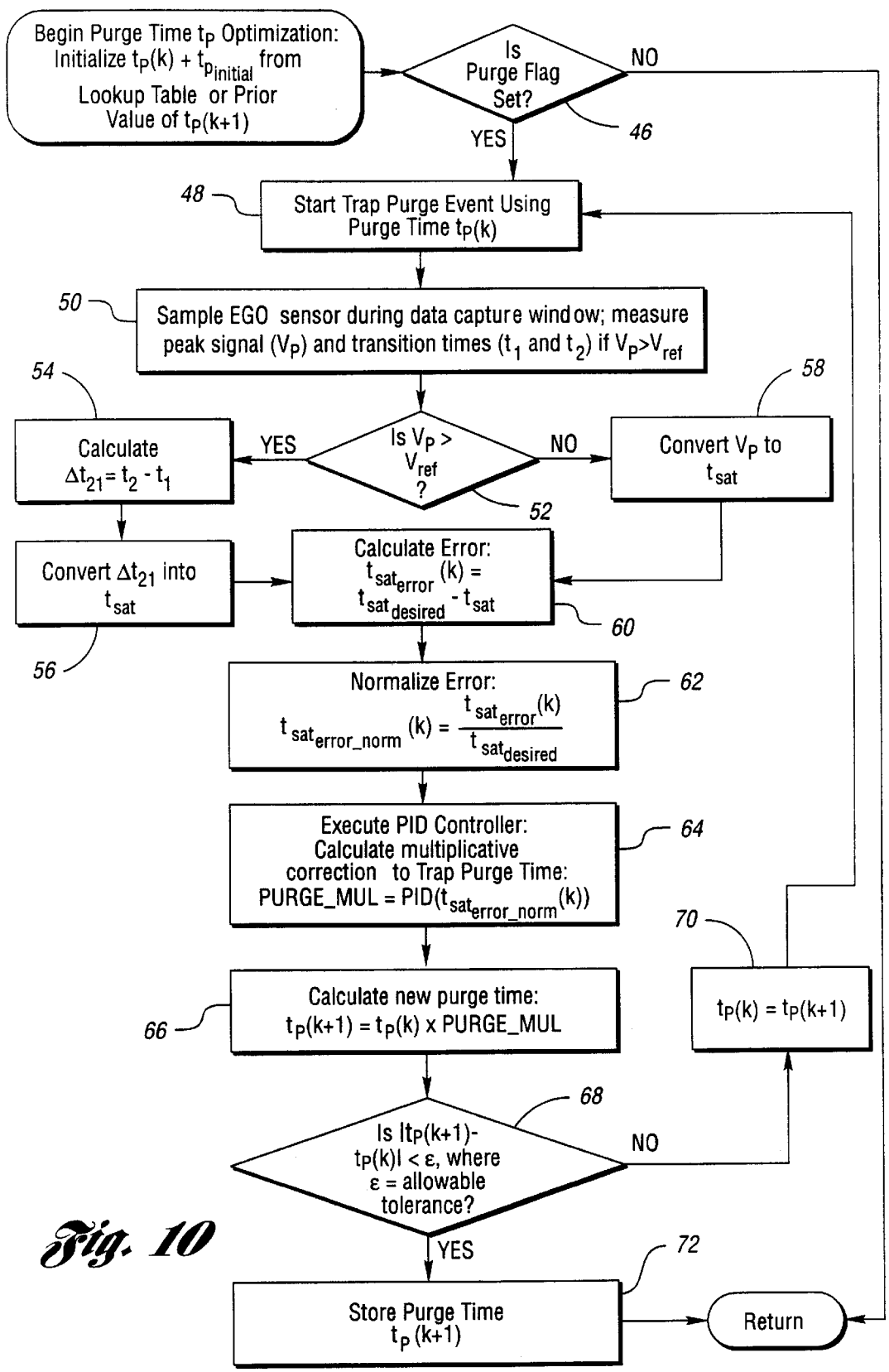
FIG. 10 is a flowchart for optimization of device purge time $t_P$.

FIG. 10 illustrates the flowchart for the optimization of the purge time $t_P$. The objective of this routine is to optimize the air-fuel ratio rich purge spike for a given value for the fill time $t_F$. This routine is contained within the software for system optimization, hereinafter described with reference to FIG. 11. At decision block 46, the state of a purge flag is checked and if set, a lean $NO_x$ purge is performed as indicated at block 48. The purge flag is set when a fill of the second device 34 has completed. For example, the flag would be set in block 136 of FIG. 19 when that purge scheduling method is used. At block 50, the oxygen sensor (EGO) voltage is sampled during a predefined capture window to determined the peak voltage $V_P$ and the transition times $t_1$ and $t_2$ if they occur. The window captures the EGO sensor waveform change, as shown in FIG. 3c. If $V_P>V_{ref}$, as determined by decision block 52, then the sensor saturation time $t_{sat}$ is proportional to $\Delta t_{21}$, the time spent above $V_{ref}$ by the EGO sensor voltage as indicated in blocks 54 and 56. Where $V_P<V_{ref}$, $t_{sat}$ is determined from a linearly extrapolated function as indicated in block 58. For this function, shown in FIG. 6, $t_{sat}$ is determined by making $t_{sat}$ proportional to the peak amplitude $V_P$. This provides a smooth transition from the case of $V_P>V_{ref}$ to the case of $V_P<V_{ref}$ providing a continuous, positive and negative, error function $t_{sat_{error}}(k)$ suitable for feedback control as indicated in block 60, wherein the error function $t_{sat_{error}}(k)$ is equal to a desired value $t_{sat_{desired}}$ for the sensor saturation time minus the actual sensor saturation time $t_{sat}$. The error function $t_{sat_{error}}(k)$ is then normalized at block 62 by dividing it by oftlinethe desired sensor saturation time $t_{sat_{desired}}$.

The resulting normalized error $$t_{sat_{error\_norm}}(k)$$

is used as the input to a feedback controller, such as a PID (proportional-differential-integral) controller. The output of the PID controller is a multiplicative correction to the device purge time, or PURGE_MUL as indicated in block 64. There is a direct, monotonic relationship between $$t_{sat_{error\_norm}}(k)$$

and PURGE_MUL. If $$t_{sat_{error\_norm}}(k) > 0,$$

the second device 34 is being underpurged and PURGE_MUL must be increased from its base value to provide more CO for the $NO_x$ purge. If $$t_{sat_{error\_norm}}(k) < 0,$$

the second device 34 is being overpurged and PURGE_MUL must be decreased from its base value to provide less CO for the $NO_x$ purge. This results in a new value of purge time $t_P(k+1)=t_P(k)\times$PURGE_MUL as indicated in block 66. The optimization of the purge time is continued until the absolute value of the difference between the old and new purge time values is less than an allowable tolerance, as indicated in blocks 68 and 70. If $|t_P(k+1)-t_P(k)|\epsilon$, then the PID feedback control loop has not located the optimum purge time $t_P$ within the allowable tolerance $\epsilon$. Accordingly, as indicated in block 70, the new purge time calculated at block 66 is used in the subsequent purge cycles until block 68 is satisfied. The fill time $t_F$ is adjusted as required using Eq.(2) (below) during the $t_P$ optimization until the optimum purge time $t_P$ is achieved. When $|t_P(k+1)-t_P(k)|<\epsilon$, then the purge time optimization has converged, the current value of the purge time is stored as indicated at 72, and the optimization procedure can move to the routine shown in FIG. 11 for the $t_F$ optimization. Instead of changing only the purge time $t_P$, the relative richness of the air-fuel ratio employed during the purge event (see FIG. 3) can also be changed in a similar manner.

Figure 11:
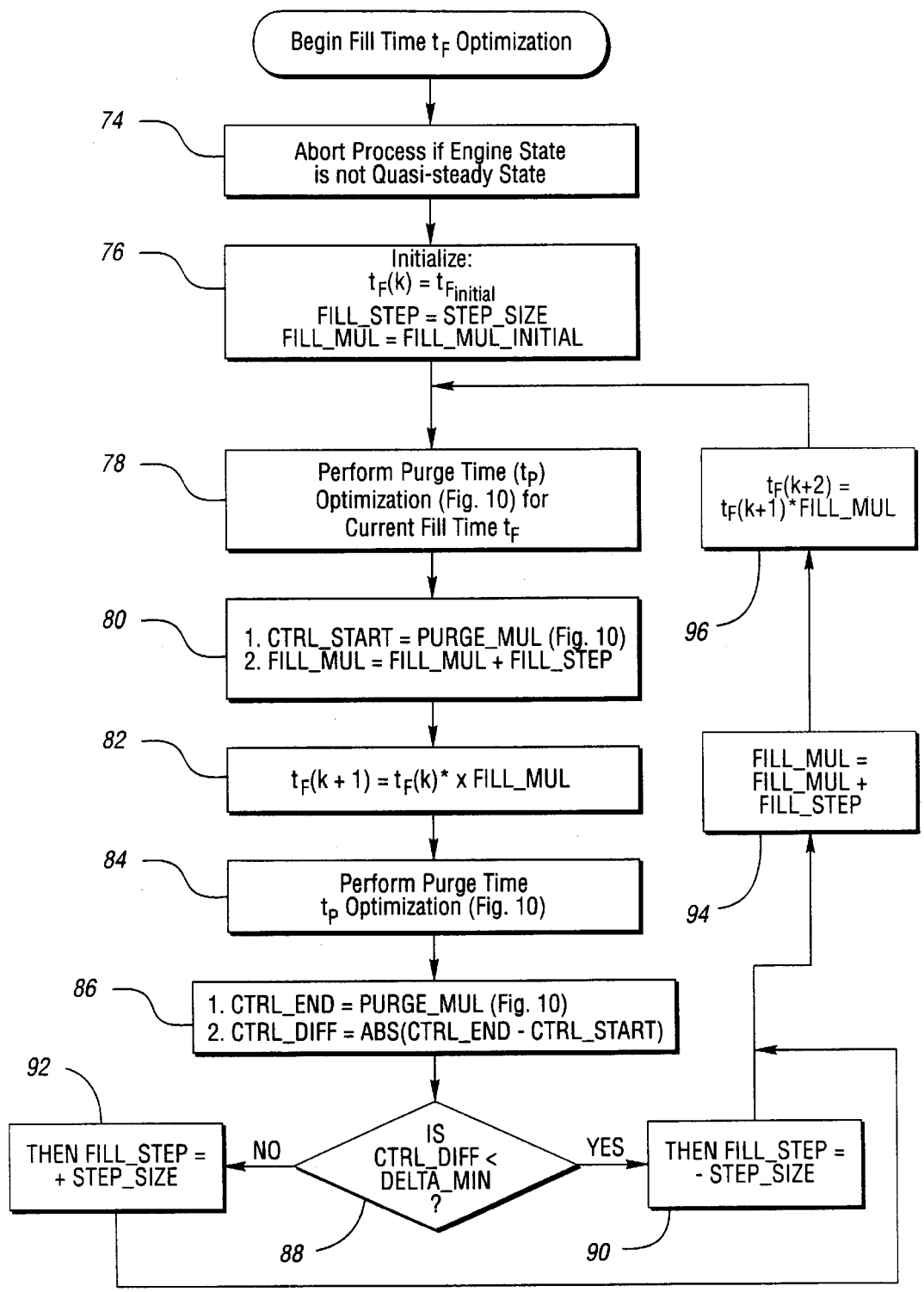
FIG. 11 is a flowchart for system optimization.
Figure 14:
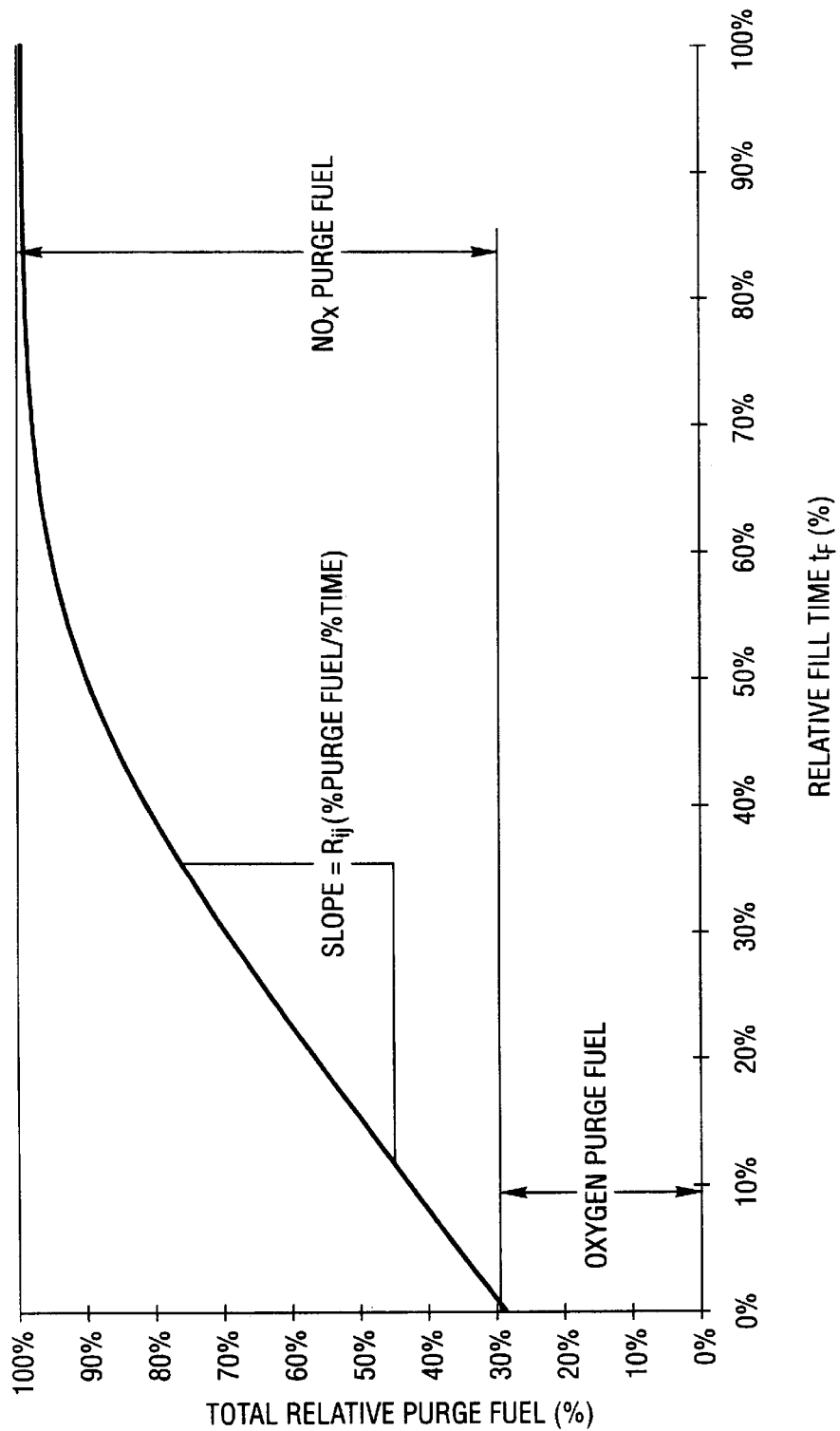
FIG. 14 is a plot of relative purge fuel versus relative fill time.

FIG. 11 is a flowchart for system optimization including both purge time and fill time optimization. The fill time optimization is carried out only when the engine is operating at quasi-steady state as indicated in block 74. In this context, a quasi-steady state is characterized in that the rates of change of certain engine operating variables, such as engine speed, load, airflow, spark timing, EGR, are maintained below predetermined levels. At block 76, the fill time step increment FILL_STEP is selected equal to STEP_SIZE, which results in increasing fill time if FILL_STEP>0. STEP_SIZE is adjusted for the capacity utilization rate $R_{ij}$ as illustrated in FIG. 14 below.

At block 78, the purge time optimization described above in connection with FIG. 10, is performed. This will optimize the purge time $t_P$ for a given fill time. The PURGE_MUL at the end of the purge optimization performed in block 78, is stored as CTRL_START, and the fill time multiplier FILL_MUL is incremented by FILL_STEP, as indicated in block 80. The fill step is multiplied by FILL_MUL in block 82 to promote the stepping of $t_F$. In block 84, the purge optimization of FIG. 10 is performed for the new fill time $t_F(k+1)$. The PURGE_MUL at the end of the purge optimization performed in FIG. 10 is stored as CTRL_END in block 86. The magnitude of the change in the purge multiplier CTRL_DIFF=ABS(CTRL_END−CTRL_START) is also stored in block 86 and compared to a reference value DELTA_MIN at block 88. DELTA_MIN corresponds to the tolerance discussed in FIG. 7a, and CTRL_END and CTRL_START correspond to the two values of $t_P$ found at A and T or at B and T of FIG. 7a. If the change in purge multiplier is greater than DELTA_MIN, the sign of FILL_STEP is changed to enable a search for an optimum fill time in the opposite direction as indicated at block 90. If the change in purge multiplier is less than DELTA_MIN, searching for the optimum fill time $t_F$ continues in the same direction as indicated in block 92. In block 94, FILL_MUL is incremented by the selected FILL_STEP. In block 96 the fill time $t_F(k+1)$ is modified by multiplying by FILL_MUL. The result will be the selection of the optimum point $t_{P_T}$ as the operating point and continuously dithering at this point. If the engine does not experience quasi-steady state conditions during this procedure, the fill time optimization is aborted, as shown in block 74, and the fill time from Eq. (2) (below) is used.

Figure 12:
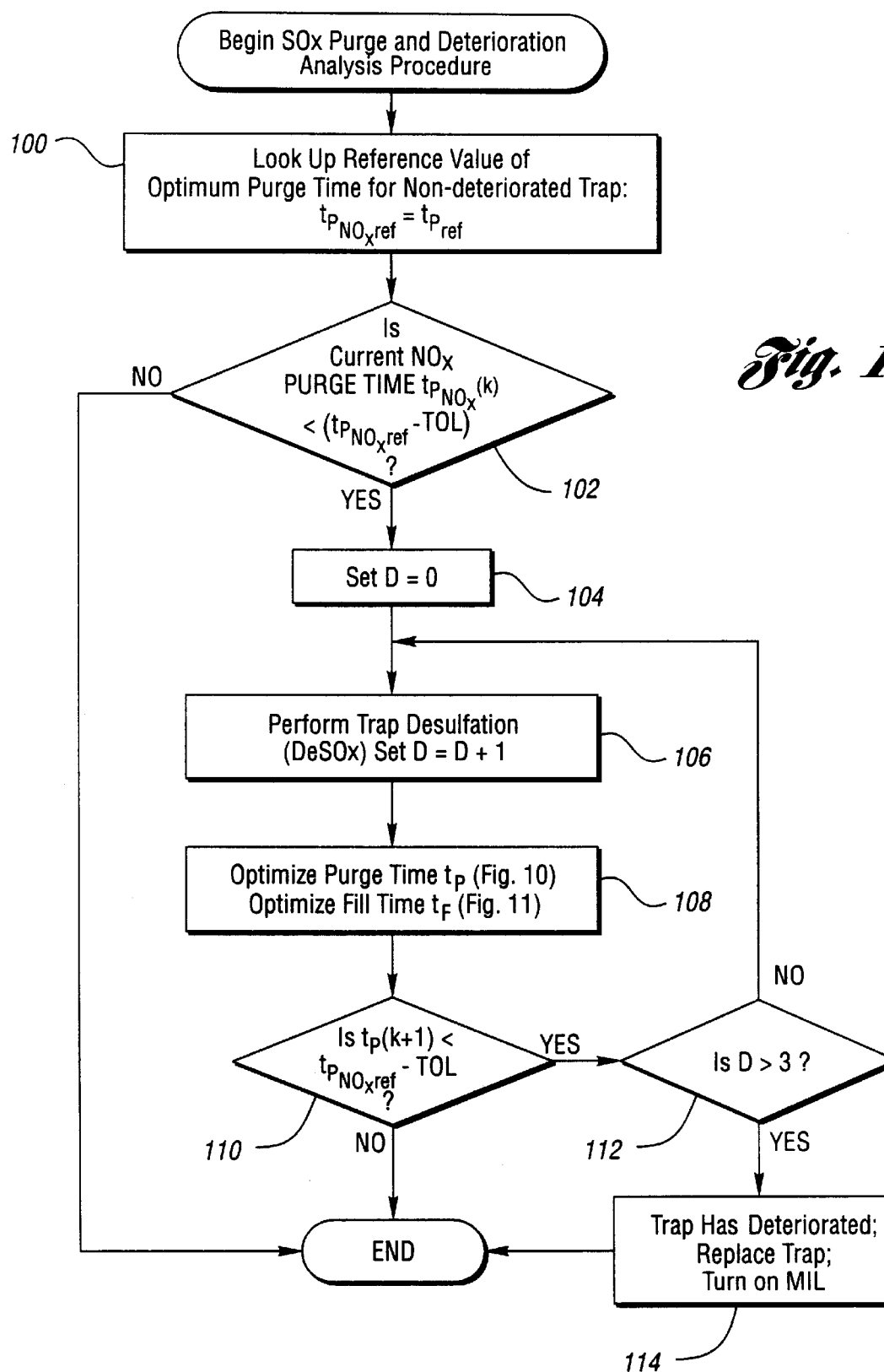
FIG. 12 is a flowchart for determining whether desulfation of the device is required.

FIG. 12 illustrates the flowchart for desulfation of the second device 34 according to the present invention. At block 100, the reference value $t_{P_{NOxref}}$ representative purge time for a nondeteriorated device 34 at the given operating conditions is retrieved from a lookup table. $t_{P_{NOxref}}$ may be a function of airflow, air-fuel ratio, and other parameters. At block 102, the current purge time $t_P(k)$ is recalled and is compared to $t_{P_{NOxref}}$ minus a predetermined tolerance TOL, and if $t_P(k)<t_{P_{NOxref}}$−TOL, then a desulfation event for the second device 34 is scheduled. Desulfation involves heating the second device 34 to approximately 650° C. for approximately ten minutes with the air-fuel ratio set to slightly rich of stoichiometry, for example, to 0.98λ. A desulfation counter D is reset at block 104 and is incremented each time the desulfation process is performed as indicated at block 106. After the desulfation process is completed, the optimum purge and fill time are determined in block 108 as previously, described in connected with FIG. 11. The new purge time $t_P(k+1)$ is compared to the reference time $t_{P_{NOxref}}$ minus the tolerance TOL at block 110 and, if $t_P(k+1)<t_{P_{NOxref}}$−TOL, at least 2 additional desulfation events are performed, as determined by the decision block 112. If the second device 34 still fails the test then a malfunction indicator lamp (MIL) is illuminated and the device 34 should be replaced with a new one as indicated in block 114. If the condition is met and $t_P(k) \geq t_{P_{NOxref}} - \text{TOL}$, the second device 34 has not deteriorated to an extent which requires immediate servicing, and normal operation is resumed.

Figure 13:
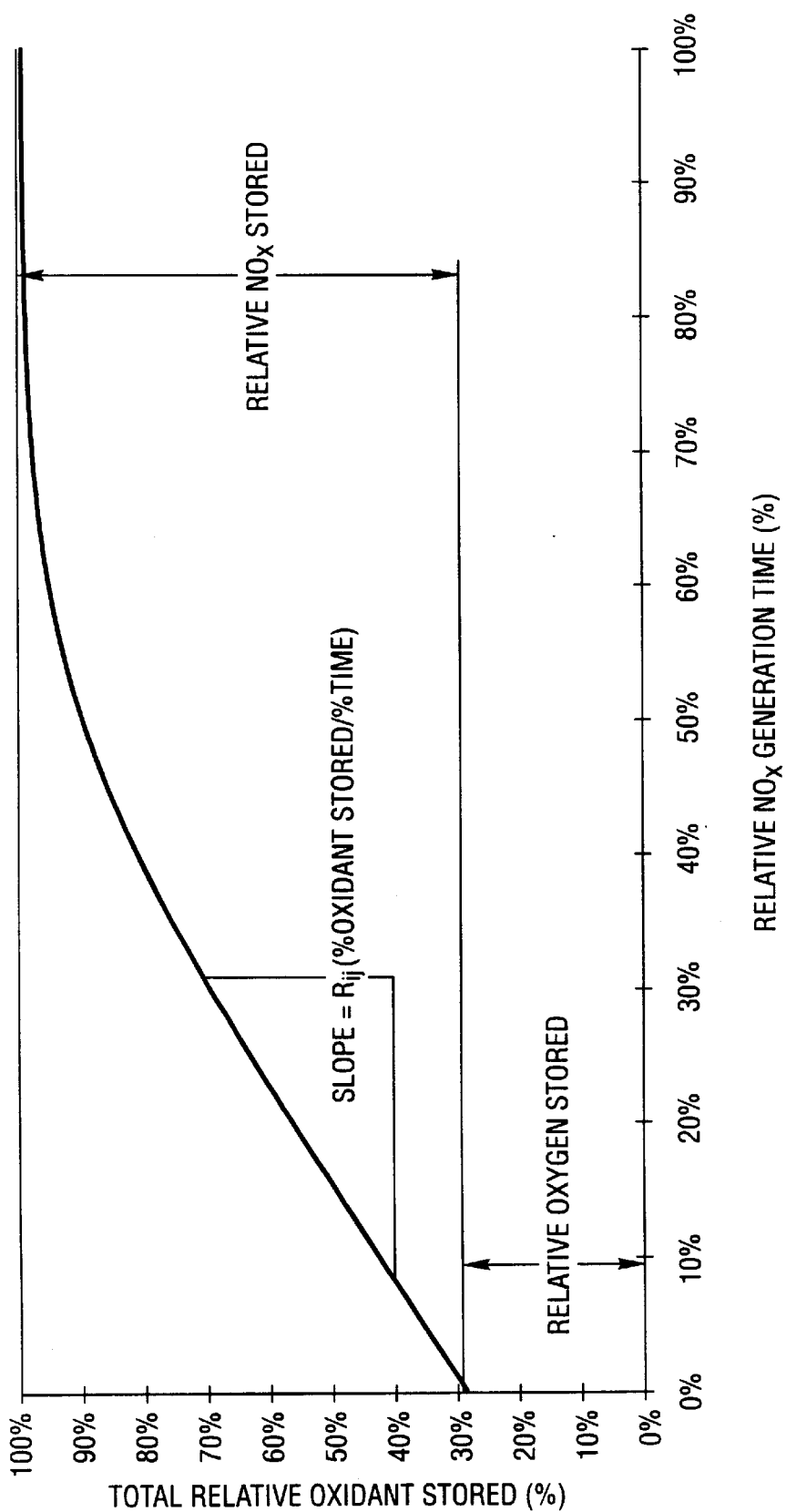
FIG. 13 is a plot of the relationship between the relative oxidant stored in the device and the relative time that the device is subjected to an input stream of $NO_x$.

A $NO_x$-purging event is scheduled when a given capacity of the second device 34, less than the device's actual capacity, has been filled or consumed by the storage of $NO_x$. Oxygen is stored in the second device 34 as either oxygen, in the form of cerium oxide, or as $NO_x$ and the sum the two is the oxidant storage. FIG. 13 illustrates the relationship between the oxidant stored in the second device 34 and the time that the device 34 is subjected to an input stream of $NO_x$. The $NO_x$ storage occurs at a slower rate than does the oxygen storage. The optimum operating point, with respect to $NO_x$ generation time, corresponds to the "shoulder" of the curve, or about 60–70% relative $NO_x$ generation time for this Figure. A value of 100% on the abscissa corresponds to the saturated $NO_x$-storage capacity of the second device 34. The values for $NO_x$ stored and for oxygen stored are also shown. The capacity utilization rate $R_{ij}$ is the initial slope of this curve, the percent oxidant stored divided by the percent $NO_x$-generating time.

FIG. 14 is similar to FIG. 13 except that the relative purge fuel is plotted versus the relative fill time $t_F$. The capacity utilization rate $R_{ij}$(% purge fuel/% fill time) is identified as the initial slope of this curve. For a given calibration of air-fuel ratio, EGR, SPK at a given speed and load point, the relationship of the relative $NO_x$ generated quantity is linearly dependent on the relative fill rate $t_F$. FIG. 14 illustrates the relationship between the amount of purge fuel, containing HC and CO, applied to the second device 34 versus the amount of time that the second device 34 is subjected to an input stream of $NO_x$. The purge fuel is partitioned between that needed to purge the stored oxygen and that needed to purge the $NO_x$ stored as nitrate.

The depletion of $NO_x$-storage capacity in the second device 34 may be expressed by the following equations.

$$RS = \sum_{k=1}^{k=P} R_{ij}(speed, load) t_k \quad (1)$$

$$RSM = M_1(T) \sum_{k=1}^{k=P} M_2(AFR) M_3(EGR) M_4(SPK_{ij}) R_{ij}(\%/s) t_k \quad (2)$$

where $RS \leq 100\%$ and $RSM \leq 100\%$ then $t_F = \sum_{k=1}^{k=P} t_k$

The base or unmodified device capacity utilization, RS (%), is given by Eq.(1), which represents a time weighted summing of the cell filling rate, $R_{ij}$(%/s), over all operating cells visited by the device filling operation, as a function of speed and load. The relative cell filling rate, $R_{ij}$(% purge fuel/% fill time), is obtained by dividing the change in purge time by the fill time $t_F$ corresponding to 100% filling for that cell. Note that Eq.(1) is provided for reference only, while Eq.(2), with its modifiers, is the actual working equation. The modifiers in Eq.(2) are $M_1$(T) for device temperature T, $M_2$ for air-fuel ratio, $M_3$ for EGR, and $M_4$ for spark advance. The individual $R_{ij}$'s are summed to an amount less than 100%, at which point the device capacity has been substantially but not fully utilized. For this capacity, the sum of the times spent in all the cells, $t_F$, is the device fill time. The result of this calculation is the effective device capacity utilization, RSM (%), given by Eq.(2). The basic filling rate for a given region is multiplied by the time $t_k$ spent in that region, multiplied by $M_2$, $M_3$, and $M_4$, and continuously summed. The sum is modified by the device temperature modifier $M_1$(T). When the modified sum RSM approaches 100%, the second device 34 is nearly filled with $NO_x$, and a purge event is scheduled.

Figures 15, 16A, 16B:
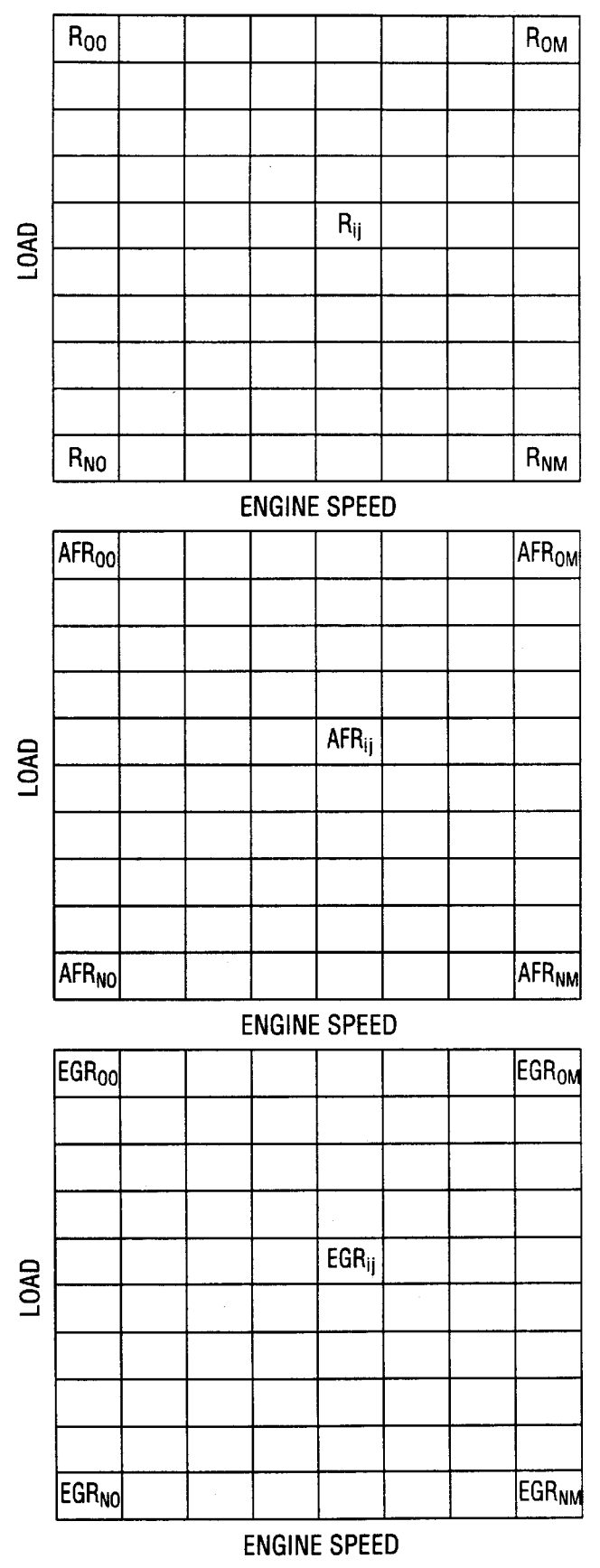

FIG. 15 shows a map of stored data for the basic device filling rate $R_{ij}$. The total system, consisting of the engine and the exhaust purification system, including the first device 30 and the second device 34, is mapped over a speed-load matrix map. A representative calibration for air-fuel ratio ("AFR"), EGR, and spark advance is used. The device temperature $T_{ij}$ is recorded for each speed load region. FIGS. 16a–16d show a representative listing of the mapping conditions for air-fuel ratio, EGR, spark advance, and device temperature $T_{ij}$ for which the device filling rates $R_{ij}$ were determined in FIG. 15.

Figures 16C, 16D, 17:
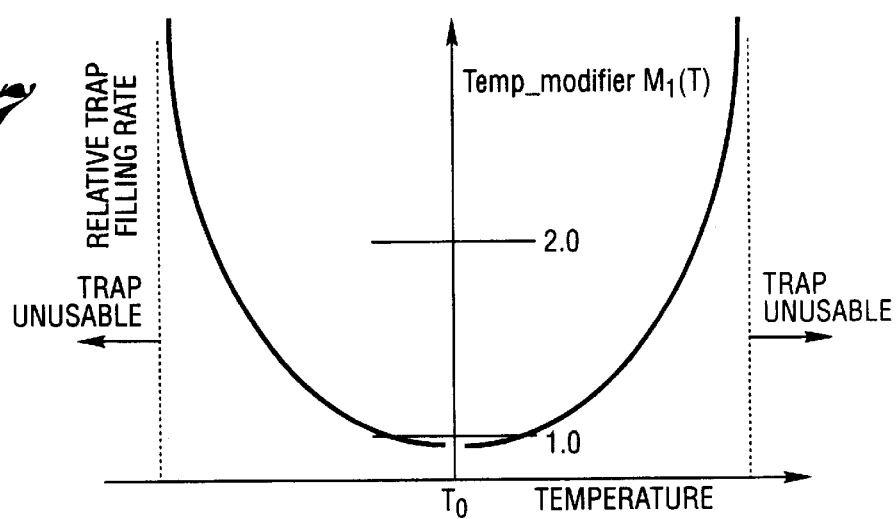

When the actual operating conditions in the vehicle differ from the mapping conditions recorded in FIG. 16, corrections are applied to the modifiers $M_1$(T), $M_2$ (AFR), $M_3$ (EGR), and $M_4$(spark advance). The correction for $M_1$(T) is shown in FIG. 17. Because the second device's $NO_x$-storage capacity reaches a maximum value at an optimal temperature $T_0$, which, in a constructed embodiment is about 350° C., a correction is applied that reduces the second device's $NO_x$-storage capacity when the device temperature T rises above or falls below the optimal temperature $T_0$, as shown.

Figure 18A:
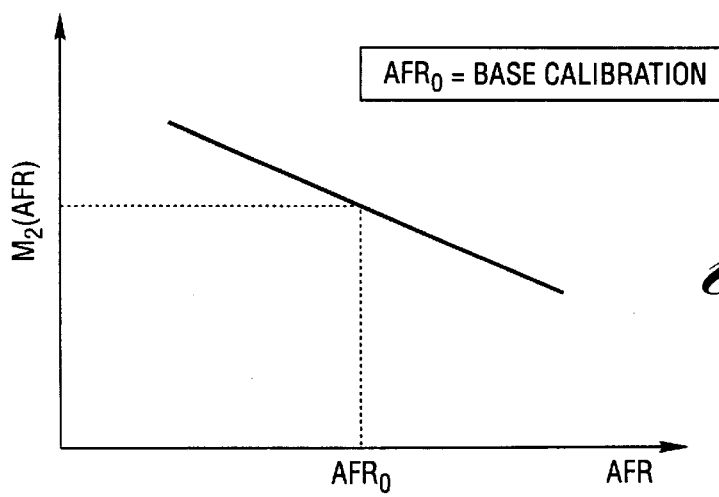
FIG. 18 shows how the air-fuel ratio, EGR, and spark advance modifiers change as the values of air-fuel ratio, EGR and spark advance vary from the mapped values in FIG. 16.
Figure 18B:
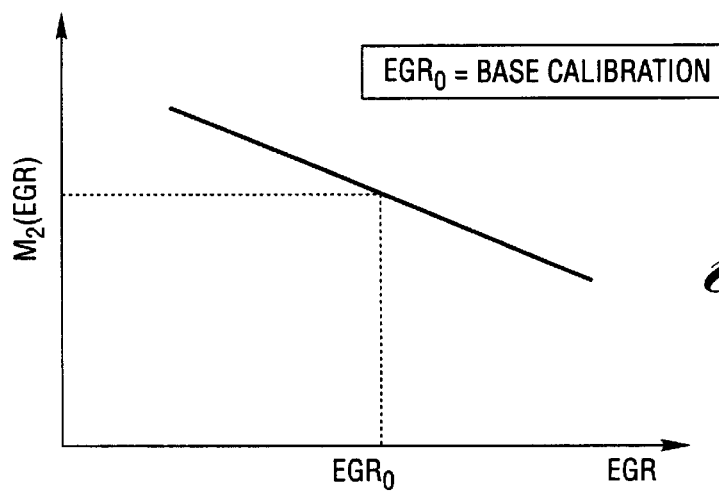
Figure 18C:
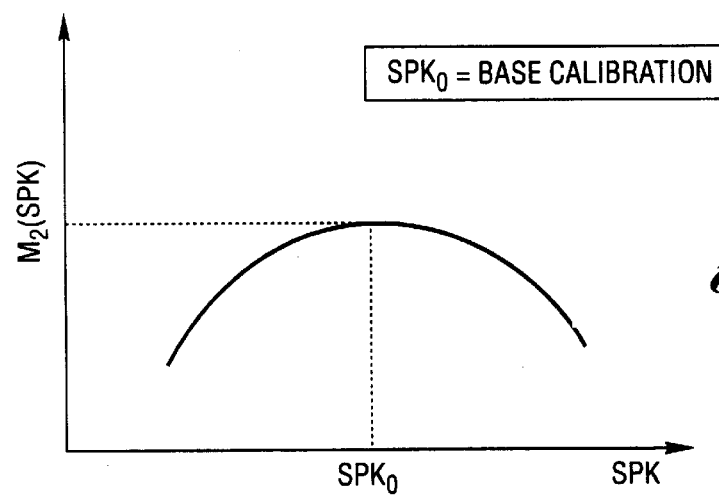

Corrections to the $M_2$, $M_3$, and $M_4$ modifiers are shown in FIGS. 18a–18c. These are applied when the actual air-fuel ratio, actual EGR, and actual spark advance differ from the values used in the mapping of FIG. 15.

Figure 19:
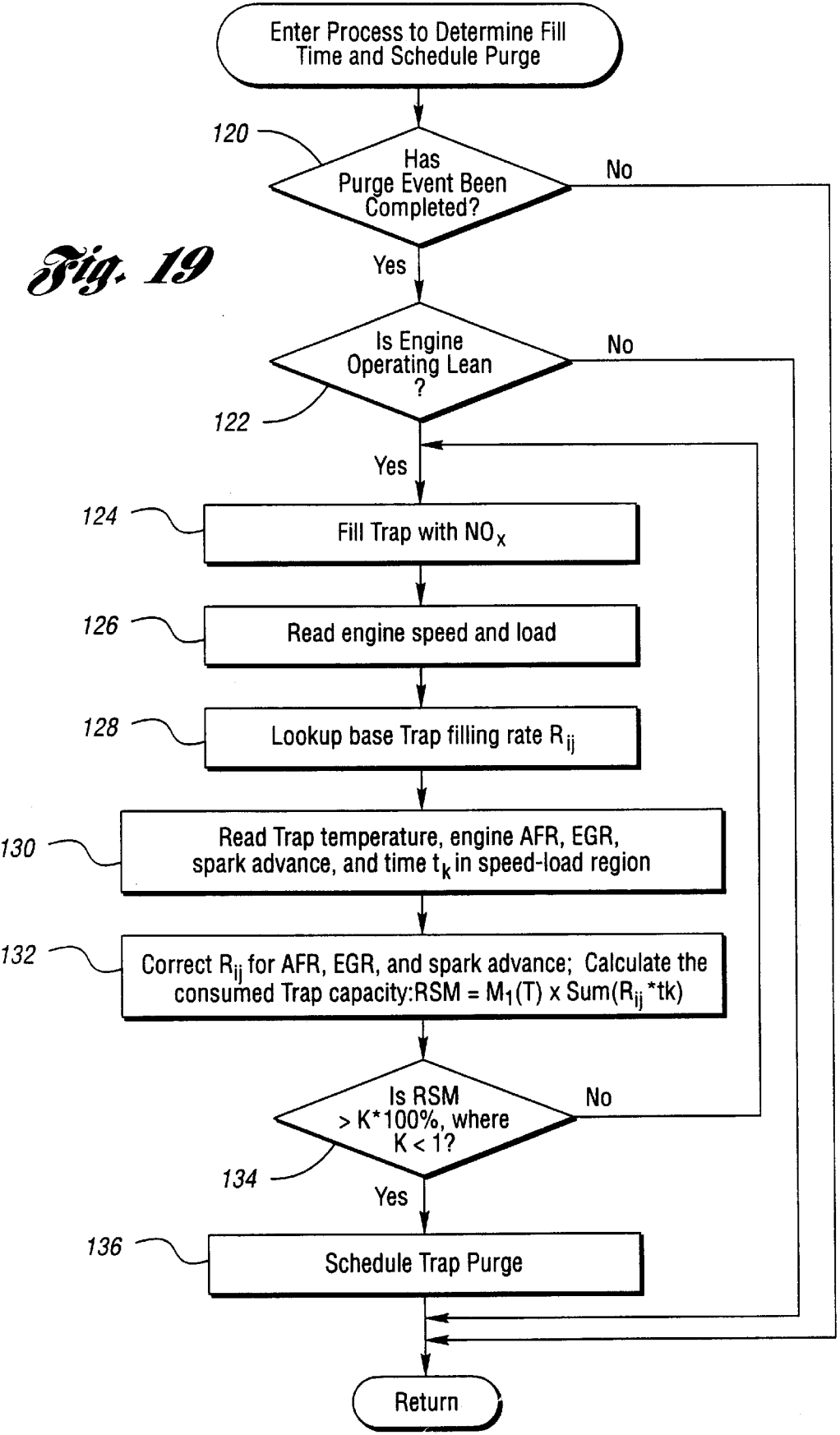
FIG. 19 is a flowchart for determining when to schedule a device purge.

FIG. 19 shows the flowchart for the determining the base filling time of the second device 34, i.e., when it is time to purge the device 34. If the purge event has been completed (as determined at block 120) and the engine is operating lean (as determined at block 122), then the second device 34 is being filled as indicated by the block 124. Fill time is based on estimating the depletion of $NO_x$ storage capacity $R_{ij}$, suitably modified for air-fuel ratio, EGR, spark advance, and device temperature. At block 126 engine speed and load are read and a base filling rate $R_{ij}$ is obtained, at block 128, from a lookup table using speed and load as the entry points (FIG. 15). The device temperature, engine air-fuel ratio, EGR spark advance and time tk are obtained in block 130 (FIGS. 16a–16d) and are used in block 132 to calculate a time weighted sum RSM, based on the amount of time spent in a given speed-load region. When RSM nears 100%, a purge event is scheduled as indicated in blocks 134 and 136. Otherwise, the device filling process continues at block 122. The fill time determined in FIG. 19 is the base fill time. This will change as the second device 34 is sulfated or subjected to thermal damage. However, the procedures described earlier (FIGS. 7a, 8, and 11), where the optimum fill time is determined by a dithering process, the need for a desulfation is determined, and a determination is made whether the second device 34 has suffered thermal damage.

The scheduled value of the purge time $t_P$ must include components for both the oxygen purge $t_{P_{OSC}}$ and the $NO_x$ purge $t_{P_{NOx}}$. Thus, $t_P = t_{P_{OSC}} + t_{P_{NOx}}$. The controller 10 contains a lookup table that provides the $t_{P_{OSC}}$, which is a strong function of temperature. For a second device 34 containing ceria, $t_{P_{OSC}}$ obeys the Arrhenius equation, $t_{P_{OSC}} = C_{exp}(-E/kT)$, where C is a constant that depends on the type and condition of the device 34, E is an activation energy, and T is absolute temperature.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A system for optimizing a purge time for an emission control device located in the exhaust passage of an engine, during which an amount of a previously-stored constituent gas of the engine-generated exhaust gas is released from the device, the system comprising:

an oxygen sensor providing an output signal representative of the concentration of oxygen present in the exhaust flowing through the device during a sampling period; and a control module for detecting the peak voltage of the sensor output voltage, calculating a purge time correction factor related to the peak voltage, and calculating a subsequent purge time as a function of the product of the correction factor and a present purge time.

2. The system of claim 1, wherein the purge time correction factor is based on the error between a desired saturation time value and a calculated saturation time value.

3. The system of claim 2, wherein the calculated saturation time value is based on the value of the peak voltage if the peak voltage is less than or equal to a predetermined reference voltage and is otherwise based on the time that the peak voltage exceeds the reference voltage.

4. The system of claim 3, wherein the error is input to a feedback controller that produces the correction factor.

5. The system of claim 4, wherein optimization of purge time is continued until the absolute value of the difference between present and subsequent purge time values, is less than an allowable tolerance.

6. The system of claim 5, wherein the error is normalized to a reference saturation value.

7. The system of claim 6, wherein the sensor is a switching-type sensor.

8. A closed-loop method of optimizing a purge time for an emission control device located in the exhaust passage of an engine upstream from a switching oxygen sensor, during which an amount of a previously-stored constituent gas of the engine-generated exhaust gas is released from the device, the method comprising:

detecting the voltage of the sensor for an existing purge time, following an existing fill time, to determine whether the purge time should be changed;

if the peak voltage of the sensor is less than a predetermined reference voltage then calculating a first saturation time based on the peak voltage;

if the peak voltage is greater than the reference voltage then measuring the time that the peak voltage remains above the reference voltage and calculating a second saturation time related to the time that the peak voltage remains above the reference voltage;

utilizing the error between a desired saturation time and the calculated saturation time as feedback to a controller for producing a purge time correction factor;

calculating the next purge time equal to the product of the correction factor and the previous purge time and;

storing the purge time when the difference between a present and subsequent purge time is greater than a predetermined tolerance.

9. The method of claim 8, wherein the fill time is based on device capacity as represented by the equation:

$$RSM = M_1(T)\sum_{k=1}^{k=P} M_2(AFR)M_3(EGR)M_4(SPK_{ij})R_{ij}(\%/s)t_k.$$

10. A method of optimizing a purge time for an emission control device located in the exhaust passage of an engine upstream from an oxygen sensor, during which an amount of a previously-stored constituent gas of the engine-generated exhaust gas is released from the device, the method comprising:

detecting the sensor output voltage;

calculating a purge time correction factor related to a characteristic of the sensor output voltage; and calculating a subsequent purge time as a function of the product of the correction factor and a present purge time.

11. The method of claim 10, wherein the purge time correction factor is based on the error between a desired saturation time value and a calculated saturation time value.

12. The method of claim 11, wherein the sensor output voltage is sampled during a window to determine the peak voltage.

13. The method of claim 12, wherein the calculated saturation time value is based on the time that the peak voltage is greater than a reference voltage.

14. The method of claim 12, wherein the calculated saturation time is based on the value of the peak voltage.

15. The method of claim 12, wherein the calculated saturation time value is based on the value of the peak voltage if the peak voltage is less than or equal to a predetermined reference voltage and is otherwise based on the time that the peak voltage exceeds the reference voltage.

16. The method of claim 15, wherein the error is input to a feedback controller that produces the correction factor.

17. The method of claim 16, wherein there is a direct, monotonic relationship between the correction factor and the error.

18. The method of claim 16, wherein optimization of purge time is continued until the absolute value of the difference between present and subsequent purge time values, is less than an allowable tolerance.

19. The method of claim 18, wherein the error is normalized to a reference saturation value.

20. The method of claim 19, wherein the sensor is a switching type sensor.

* * * * *